US00RE42146E

(19) United States
(12) Reissued Patent
Sawabe et al.

(10) Patent Number: US RE42,146 E
(45) Date of Reissued Patent: Feb. 15, 2011

(54) INFORMATION RECORDING MEDIUM, INFORMATION RECORDING APPARATUS AND METHOD, INFORMATION REPRODUCING APPARATUS AND METHOD, COMPUTER DATA SIGNAL EMBODIED IN A CARRIER WAVE

(75) Inventors: Takao Sawabe, Tokorozawa (JP); Masanori Nakahara, Tokorozawa (JP)

(73) Assignee: Pioneer Corporation, Tokyo-to (JP)

(21) Appl. No.: 11/802,555

(22) Filed: May 23, 2007

Related U.S. Patent Documents

Reissue of:
(64) Patent No.: 6,898,160
Issued: May 24, 2005
Appl. No.: 09/900,152
Filed: Jul. 9, 2001

(30) Foreign Application Priority Data

Jul. 10, 2000 (JP) ..... 2000-209026

(51) Int. Cl.
*G11B 17/22* (2006.01)
*G11B 5/09* (2006.01)

(52) U.S. Cl. ..... 369/30.09; 369/47.23; 369/95; 369/125; 386/95; 386/125

(58) Field of Classification Search ..... 369/30.09, 369/47.23, 125, 95, 47.14, 53.15, 83, 53.17, 369/53.34, 275.3, 47.15, 47.24, 47.28, 53.37, 369/59.23; G9B 20.1, 27.001, 27.012, 27.055
See application file for complete search history.

(56) References Cited

U.S. PATENT DOCUMENTS 5,870,523 A 2/1999 Kikuchi et al.
5,986,979 A 11/1999 Bickford et al.
6,157,769 A 12/2000 Yoshimura et al.
6,188,662 B1 2/2001 Maeda et al.
6,304,534 B1 10/2001 Ito et al.
6,385,148 B2 5/2002 Ito et al.
6,681,077 B1 1/2004 Murase et al.
6,724,703 B2 4/2004 Nakahara et al.

FOREIGN PATENT DOCUMENTS

| | | | |
|---|---|---|---|
| EP | 0 689 206 | | 12/1995 |
| EP | 0 689 206 | A1 * | 12/1995 |
| EP | 0 944 087 | | 9/1999 |
| EP | 0 944 087 | A2 * | 9/1999 |
| JP | 8-273304 | | 10/1996 |
| JP | 9-102185 | | 4/1997 |
| JP | 09-274776 | | 10/1997 |
| JP | 2000-137973 | | 5/2000 |
| WO | WO 95/16262 | | 6/1995 |
| WO | WO 97/05616 | | 2/1997 |

* cited by examiner

*Primary Examiner*—Ali Neyzari
(74) *Attorney, Agent, or Firm*—Drinker Biddle & Reath LLP

(57) ABSTRACT

DVD 1' has recording information areas VOR, AOR in which recording information is recorded and reproducing procedure information recording areas VNA, ANA in which reproducing procedure information indicating reproducing procedures of the recording information is recorded. In addition, this DVD 1' has an integrated reproducing procedure information recording area GNA in which an integrated reproducing procedure information is recorded. The integrated reproducing procedure information indicates reproducing procedures to sequentially reproduce a plurality of recording information including recording information recorded in other DVD. Upon reproducing, the recording information recorded astride a plurality of DVDs is reproduced in accordance with the integrated reproducing procedure information.

43 Claims, 14 Drawing Sheets

FIG. 9 AMENDED
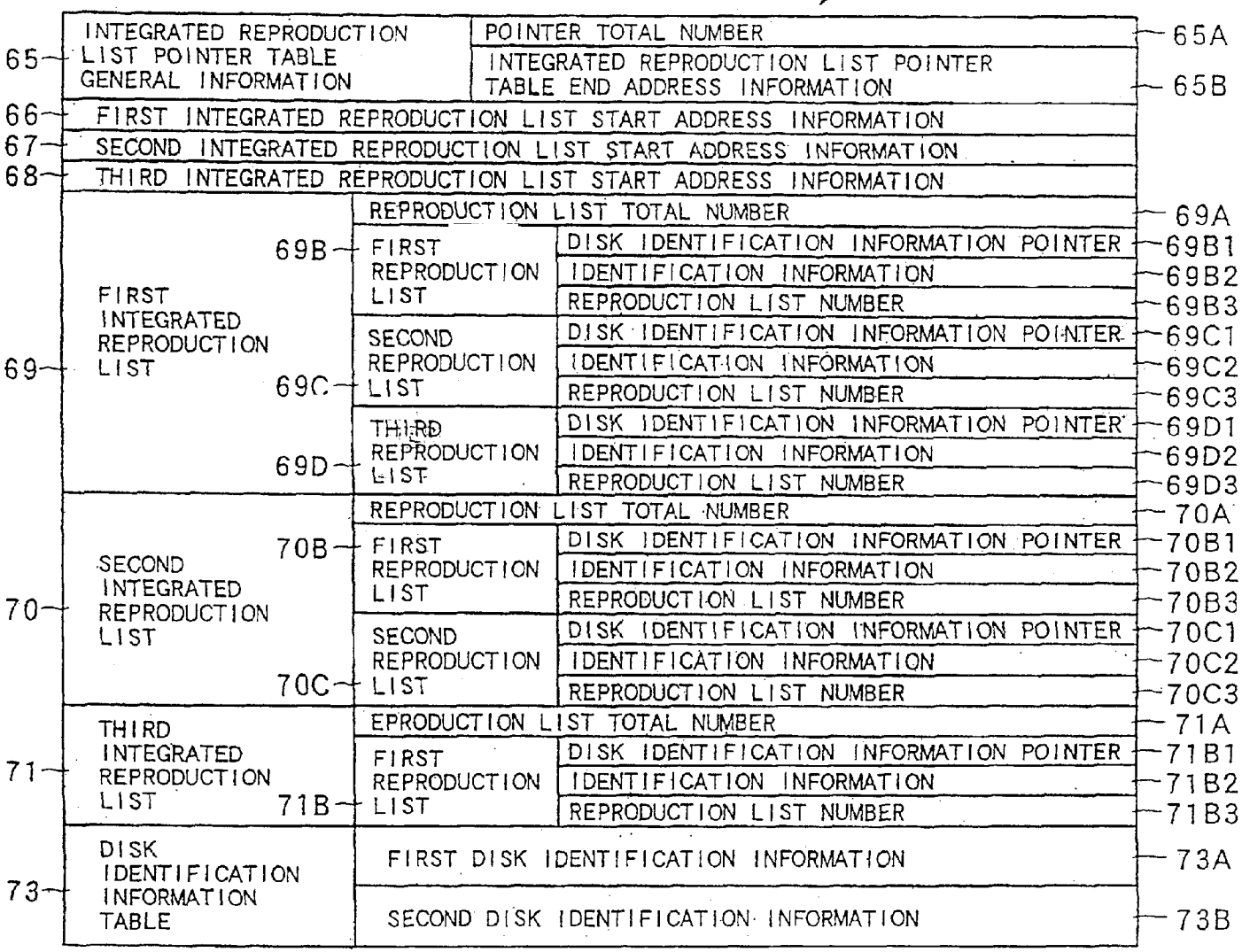

INFORMATION RECORDING MEDIUM, INFORMATION RECORDING APPARATUS AND METHOD, INFORMATION REPRODUCING APPARATUS AND METHOD, COMPUTER DATA SIGNAL EMBODIED IN A CARRIER WAVE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a technical field of an information recording medium, an information recording apparatus and method, an information reproducing apparatus and method, and a computer data signal embodied in a carrier wave. More particularly, the present invention relates to a technical field of an information recording medium in which different kinds of plural items of recording information such as audio information and video information are recorded; an information recording apparatus and method for recording information in the information recording medium; an information reproducing apparatus and method for reproducing the recorded information from the information recording medium; and a computer data signal embodied in a carrier wave, which enables a computer to perform such a recording process or reproducing process.

2. Description of the Related Art

In recent years, there is generally known a reproduction-only video DVD that is an information recording medium in which video information such as movie including image information and music information associated with the image information is recorded. More specifically, the reproduction-only DVD is a DVD whose format is in conformity with a DVD video standard.

The video DVD is widely used as an information recording medium in which image information such as movie is recorded due to its large capacity.

On one hand, with respect to audio information such as music information, which includes sound information such as music information and voice information and also includes still image information associated with the sound information, there has been developed and commercially available an audio DVD in consideration of recording of only the audio information. More specifically, the audio DVD is a reproduction-only DVD whose recording format is in conformity with a DVD audio standard.

With respect to a case in which the video information or audio information is recorded in a DVD, a household recordable DVD and a recording format for recording video information in the household recordable DVD (hereinafter, referred to as a video recording standard) are under development. Recently, a household information recording apparatus (recorder) for recording the above video information or the like in a re-recordable DVD-RW (DVD-Re-recordable) has been further developed and commercially available.

At present, the development of a recording format for recording audio information in a DVD (hereinafter, referred to as an audio recording standard) or computer data information, for example, other than the above video information or audio information is underway.

At this time, under the above described circumference, in the near future, it is expected that there will be introduced a DVD information recording apparatus comprising two or more kinds of various functions, i.e., a video information recording function for recording video information in a DVD; an audio information recording function for recording audio information in a DVD; or data information recording function for recording the above data information in a DVD.

In this case, DVDs currently used for recording includes the above re-recordable DVD-RW or a DVD-R (DVD-Recordable) capable of only one recording and incapable of deletion. In any case, it is expected that there will be a glowing demand for a function for recording information irrespective of video information or audio information in one DVD indiscriminately, or for a function capable of recording data information acquired by electronic distribution or the like in the same DVD.

Further, in this case, it would be very effective to provide a function for freely extracting the user's desired scene, music or data information or the like from a plurality of recording information such as video information recorded in advance in a plurality of DVDs during reproduction, and freely setting even the order of reproduction such as the extracted scene or the like irrespective of various kinds of recording information.

SUMMARY OF THE INVENTION

The present invention has been made in view of the above circumstance. It is an object of the present invention to provide: an information recording medium capable of, in the case where recording information such as video information or audio information is recorded id a plurality DVDs, sequentially reproducing each of recording information based on reproducing procedures (sequences) freely set by a user irrespective of the discrimination of each of recording information, thereby recording plural kinds of recording information in various reproduction manners; an information recording apparatus and method for recording information required for the information recording medium; and an information reproducing apparatus and method for reproducing the recording information from the information recording medium; and a computer data signal embodied in a carrier wave, which enables a computer to perform such a recording process or reproducing process.

The above object of the present invention can be achieved by an information recording medium of the present invention including recording information area in which recording information is recorded and reproducing procedure information recoding area in which reproducing procedure information indicating at least one reproducing procedure to reproduce the recording information is recorded, wherein the information recording medium further includes integrated reproducing procedure information recoding area in which integrated reproducing procedure information is recorded, the integrated reproducing procedure information indicating at least one reproducing procedure to sequentially reproduce a plurality of the recording information including recording information recorded in other information recording medium.

According to the present invention, a plurality of the recording information can be sequentially reproduced in accordance with a desired reproducing procedure in a plurality of information recording medium and across the boundary. Therefore, the recording information can be reproduced in variety manners.

In one aspect of the present invention, the integrated reproducing procedure information includes at least: indicative information indicating the reproducing procedure information that corresponds to the recording information to be sequentially reproduced; and recording medium identification information indicating the other information recording medium.

According to this aspect, the integrated reproducing procedure information indicates reproducing procedure information based on indicative information, and thus, desired reproducing procedure information can be reliably specified so that the recording information can be reproduced based on the desired reproducing procedure information.

In another aspect of the present invention, the integrated reproducing procedure information further includes the indicative information indicating the reproducing procedure information contained in the recording medium itself in which the integrated reproducing procedure information is recorded, and the recording medium identification information indicates only said other information recording medium.

According to this aspect, when the integrated reproducing procedure information includes the indicative information indicating the reproducing procedure information contained in the recording medium itself in which the integrated reproducing procedure information is recorded, the indicative information is not recorded. Therefore, it is possible to prevent the integrated reproducing procedure information from unnecessarily bloating.

In further aspect of the present invention, each of the reproducing procedure information includes at least one reproducing procedure to reproduce each of the recording information in accordance with a procedure that differs from a recording procedure when each of the recording information is recorded in the information recording medium.

According to this aspect, each of the recoding information can be sequentially reproduced in a manner desired by a user.

In further aspect of the present invention, each of the recording information is any one of video information, audio information and data information.

According to this aspect, the video information, the audio information and the data information can be reproduced all together.

In further aspect of the information recording medium of the present invention, the information recording medium is a DVD.

According to this aspect, different kinds of the recording information can be reproduced for a long time.

The above object of the present invention can be achieved by an information recording apparatus of the present information for recording integrated reproducing procedure information in an information recording medium in which recording information is recorded together with reproducing procedure information indicating at least one reproducing procedure to reproduce the recording information, said integrated reproducing procedure information indicating at least one reproducing procedure to sequentially reproduce a plurality of recording information including recording information recorded in other information recording medium. The information recording apparatus is provided with: a selecting device for selecting the reproducing procedure information to be employed for generating the integrated reproducing procedure information; a generating device for generating the integrated reproducing procedure information by employing the selected reproducing procedure information; and a recording device for recording the generated integrated reproducing procedure information in said information recording medium.

According to the present invention, the reproducing procedure information that correspond to a plurality of recording information recorded in a plurality of information recording mediums are selected and extracted to generate the integrated reproducing procedure information. Thus, the integrated reproducing procedure information can be recorded so as to sequentially reproduce a plurality of recording information in accordance with desired reproducing procedures and across the boundary. Therefore, the recording information can be reproduced in variety manners.

In one aspect of the present invention, the information recording apparatus is further provided with a procedure information generating device for newly generating required reproducing procedure information when the reproducing procedure information to be employed for generating the integrated reproducing procedure information does not exist in any one of said information recording medium and said other information recording medium. In addition, the generating device generates the integrated reproducing procedure information by employing the selected reproducing procedure information and the newly generated reproducing procedure information.

According to this aspect, when desired reproducing procedure information does not exist in any one of the information recording mediums, the required reproducing procedure information is newly generated to generate the integrated reproducing procedure information. Thus, the integrated reproducing procedure information can be recorded so as to be reproduced in accordance with more freely determined reproducing procedures.

In another aspect of the present invention, the integrated reproducing procedure information includes at least: indicative information indicating the reproducing procedure information that corresponds to the recording information to be sequentially reproduced; and recording medium identification information indicating the other information recording medium.

According to this aspect, the integrated reproducing procedure information is recorded so that it indicates the reproducing procedure information by using the indicative information, and identifies the information recording medium by using recording medium identification information. Therefore, it is possible to record the integrated reproducing procedure information so that desired reproducing procedure is specified and the recording information is reproduced with reliability.

In further aspect of the present invention, the integrated reproducing procedure information further includes the indicative information indicating the reproducing procedure information contained in the recording medium itself in which the integrated reproducing procedure information is recorded, and the recording medium identification information indicates only said other information recording medium.

According to this aspect, when the integrated reproducing procedure information includes the indicative information indicating the reproducing procedure information contained in the recording medium itself in which the integrated reproducing procedure information is recorded, the indicative information is not recorded. Therefore, it is possible to prevent the integrated reproducing procedure information from unnecessarily bloating.

In further aspect of the present invention, each of the recording information is any one of video information, audio information and data information.

According to this aspect, the integrated reproducing procedure information can be recorded so as to reproduce a variety of recording information such video information, audio information and data information indiscriminately.

In further aspect of the information recording apparatus of the present invention, the information recording medium is a DVD.

According to this aspect, a number of integrated reproducing procedure information can be recorded, whereby the integrated reproducing procedure information can be recorded so as to reproduce each of recording information more freely.

The above object of the present invention can be achieved by an information recording method of the present invention for recording integrated reproducing procedure information in an information recording medium in which recording information is recorded together with reproducing procedure information indicating at least one reproducing procedure to reproduce the recording information, said integrated reproducing procedure information indicating at least one reproducing procedure to sequentially reproduce a plurality of recording information including recording information recorded in other information recording medium. The information recording method is provided with the processes of: selecting the reproducing procedure information to be employed for generating the integrated reproducing procedure information from a plurality of information recording mediums; generating the integrated reproducing procedure information by employing the selected reproducing procedure information; and recording the generated integrated reproducing procedure information in said information recording medium.

According to the present invention, the reproducing procedure information that correspond to a plurality of recording information recorded in a plurality of information recording mediums are selected and extracted to generate the integrated reproducing procedure information. Thus, the integrated reproducing procedure information can be recorded so as to sequentially reproduce a plurality of recording information in accordance with desired reproducing procedures and across the boundary. Therefore, the recording information can be reproduced in variety manners.

In one aspect of the present invention, the information recording method is further provided with the process of newly generating required reproducing procedure information when the reproducing procedure information to be employed for generating the integrated reproducing procedure information does not exist in any one of said information recording medium and said other information recording medium, wherein the process of generating the integrated reproducing procedure information generates the integrated generating procedure information by employing the selected generating procedure information and the newly generated reproducing procedure information.

According to this aspect, when desired reproducing procedure information does not exist in any one of the information recording mediums, the required reproducing procedure information is newly generated to generate the integrated reproducing procedure information. Thus, the integrated reproducing procedure information can be recorded so as to be reproduced in accordance with more freely determined reproducing procedures.

In another aspect of the present invention, the integrated reproducing procedure information includes at least: indicative information indicating the reproducing procedure information that corresponds to the recording information to be sequentially reproduced; and recording medium identification information indicating the other information recording medium.

According to this aspect, the integrated reproducing procedure information is recorded so that it indicates the reproducing procedure information by using the indicative information, and identifies the information recording medium by using recording medium identification information. Therefore, it is possible to record the integrated reproducing procedure information so that desired reproducing procedure is specified and the recording information is reproduced with reliability.

In further aspect of the present invention, the integrated reproducing procedure information further includes the indicative information indicating the reproducing procedure information contained in the recording medium itself in which the integrated reproducing procedure information is recorded, and the recording medium identification information indicates only said other information recording medium.

According to this aspect, when the integrated reproducing procedure information includes the indicative information indicating the reproducing procedure information contained in the recording medium itself in which the integrated reproducing procedure information is recorded, the indicative information is not recorded. Therefore, it is possible to prevent the integrated reproducing procedure information from unnecessarily bloating.

The above object of the present invention can be achieved by an information recording medium of the present invention in which an information recording control program is readably recorded by a computer included in an information recording apparatus for recording integrated reproducing procedure information in an information recording medium in which recording information is recorded together with reproducing procedure information indicating at least one reproducing procedure to reproduce the recording information, said integrated reproducing procedure information indicating at least one reproducing procedure to sequentially reproduce a plurality of recording information including recording information recorded in other information recording medium. The information recording control program causes the computer to function as: a selecting device for selecting the reproducing procedure information to be employed for generating the integrated reproducing procedure information; a generating device for generating the integrated reproducing procedure information by employing the selected reproducing procedure information; and a recording device for recording the generated integrated reproducing procedure information in said information recording medium.

According to the present invention, the reproducing procedure information that correspond to a plurality of recording information recorded in a plurality of information recording mediums are selected and extracted to generate the integrated reproducing procedure information. Thus, the integrated reproducing procedure information can be recorded so as to sequentially reproduce a plurality of recording information in accordance with desired reproducing procedures and across the boundary. Therefore, the recording information can be reproduced in variety manners.

In another aspect of the present invention, the information recording control program causes the computer to further function as: a procedure information generating device for newly generating required reproducing procedure information when the reproducing procedure information to be employed for generating the integrated reproducing procedure information docs not exist in any one of said information recording medium and said other information recording medium. In addition, the generating device generates the integrated reproducing procedure information by employing the selected reproducing procedure information and the newly generated reproducing procedure information.

According to this aspect, when desired reproducing procedure information does not exist in any one of the information recording mediums, the required reproducing procedure information is newly generated to generate the integrated reproducing procedure information. Thus, the integrated reproducing procedure information can be recorded so as to be reproduced in accordance with more freely determined reproducing procedures.

The above object of the present invention can be achieved by an information reproducing apparatus of the present invention for reproducing recording information from an information recording medium in which integrated reproducing procedure information is recorded in an information recording medium in which recording information is recorded together with reproducing procedure information indicating at least one reproducing procedure to reproduce the recording information, said integrated reproducing procedure information indicating at least one reproducing procedure to sequentially reproduce a plurality of recording information including recording information recorded in other information recording medium. The information reproducing apparatus is provided with: a selecting device for selecting any one of the integrated reproducing procedure information from a plurality of information recording mediums; an acquiring device for acquiring the reproducing procedure information from any one of said plurality of information recording mediums, said reproducing procedure information corresponding to at least one reproducing procedure indicated by the selected integrated reproducing procedure information; and a reproducing device for reproducing the recoding information in accordance with at least one reproducing procedure indicated by the acquired reproducing procedure information.

According to the present invention, the integrated reproducing procedure information is generated on the basis of the reproducing procedure information that correspond to a plurality of recording information recorded in a plurality of information recording mediums, and recoded in the information recording medium. Therefore, when the recording information is reproduced on the basis of the integrated reproducing procedure information, a plurality of recording information can be sequentially reproduced in a plurality of information recording mediums in accordance with desired reproducing procedures and across the boundary. Therefore, the recording information can be reproduced in variety manners.

In one aspect of the present invention, the integrated reproducing procedure information includes at least: indicative information indicating the reproducing procedure information that corresponds to the recording information to be sequentially reproduced; and recording medium identification information indicating the other information recording medium.

According to this aspect, the integrated reproducing procedure information is associated with a reproducing procedure to reproduce a plurality of recording information recorded in a plurality of information recording mediums, via the indicative information. In addition, the information recording medium can be identified by using the recording medium identification information. Therefore, it is possible to reproduce the recording information by using desired reproducing procedure with reliability.

In another aspect of the present invention, the integrated reproducing procedure information further includes the indicative information indicating the reproducing procedure information contained in the recording medium itself in which the integrated reproducing procedure information is recorded, and the recording medium identification information indicates only said other information recording medium.

According to this aspect, when the integrated reproducing procedure information includes the indicative information indicating the reproducing procedure information contained in the recording medium itself in which the integrated reproducing procedure information is recorded, the indicative information is not recorded. Therefore, it is possible to prevent the integrated reproducing procedure information from unnecessarily bloating.

In further aspect of the present invention, each of the reproducing procedure information includes at least one reproducing procedure to reproduce each of the recording information in accordance with a procedure that differs from a recording procedure when each of the recording information is recorded in the information recording medium.

According to this aspect, each of the recoding information can be sequentially reproduced in a manner desired by a user.

In further aspect of the present invention, each of the recording information is any one of video information, audio information and data information.

According to this aspect, the video information, the audio information and the data information can be reproduced indiscriminately by freely combining them with each other.

In further aspect of the information reproducing apparatus of the present invention, the information recording medium is a DVD.

According to this aspect, each of the recording information can be reproduced for a long time in accordance with more freely determined reproducing procedures.

The above object of the present invention can be achieved by an information reproducing method of the present invention for reproducing recording information from an information recording medium in which integrated reproducing procedure information is recorded in an information recording medium in which recording information is recorded together with reproducing procedure information indicating at least one reproducing procedure to reproduce the recording information, said integrated reproducing procedure information indicating at least one reproducing procedure to sequentially reproduce a plurality of recording information including recording information recorded in other information recording medium. The information reproducing method is provided with the processes of: selecting any one of the integrated reproducing procedure information from a plurality of information recording mediums; acquiring the reproducing procedure information from any one of said plurality of information recording mediums, said reproducing procedure information corresponding to at least one reproducing procedure indicated by the selected integrated reproducing procedure information; and reproducing the recoding information in accordance with at least one reproducing procedure indicated by the acquired reproducing procedure information.

According to the present invention, the integrated reproducing procedure information is generated on the basis of the reproducing procedure information that correspond to a plurality of recording information recorded in a plurality of information recording mediums, and recoded in the information recording medium. Therefore, when the recording information is reproduced on the basis of the integrated reproducing procedure information, a plurality of recording information can be sequentially reproduced in a plurality of information recording mediums in accordance with desired reproducing procedures and across the boundary. Therefore, the recording information can be reproduced in variety manners.

The above object of the present invention can be achieved by an information recording medium of the present invention in which an information reproducing control program is readably recorded by a computer included in an information reproducing apparatus for reproducing recording information from an information recording medium in which integrated reproducing procedure information is recorded in an information recording medium in which recording information is recorded together with reproducing procedure information indicating at least one reproducing procedure to reproduce the recording information, said integrated reproducing procedure information indicating at least one reproducing procedure to sequentially reproduce a plurality of recording information including recording information recorded in other information recording medium. The information reproducing control program causes the computer to function as: a selecting device for selecting any one of the integrated reproducing procedure information from a plurality of information recording mediums; an acquiring device for acquiring the reproducing procedure information from any one of said plurality of information recording mediums, said reproducing procedure information corresponding to at least one reproducing procedure indicated by the selected integrated reproducing procedure information; and a reproducing device for reproducing the recoding information in accordance with at least one reproducing procedure indicated by the acquired reproducing procedure information.

According to the present invention, the integrated reproducing procedure information is generated on the basis of the reproducing procedure information that correspond to a plurality of recording information recorded in a plurality of information recording mediums, and recoded in the information recording medium. Therefore, when the recording information is reproduced on the basis of the integrated reproducing procedure information, a plurality of recording information can be sequentially reproduced in a plurality of information recording mediums in accordance with desired reproducing procedures and across the boundary. Therefore, the recording information can be reproduced in variety manners.

The above object of the present invention can be achieved by a computer data signal of the present invention embodied in a carrier wave and representing a series of instructions which cause a computer to perform steps to execute a recording process in an information recording apparatus for recording integrated reproducing procedure information in an information recording medium in which recording information is recorded together with reproducing procedure information indicating at least one reproducing procedure to reproduce the recording information, said integrated reproducing procedure information indicating at least one reproducing procedure to sequentially reproduce a plurality of recording information including recording information recorded in other information recording medium. The steps are provided with: a selecting step for selecting the reproducing procedure information to be employed for generating the integrated reproducing procedure information; a generating step for generating the integrated reproducing procedure information by employing the selected reproducing procedure information; and a recording step for recording the generated integrated reproducing procedure information in said information recording medium.

According to the present invention, the reproducing procedure information that correspond to a plurality of recording information recorded in a plurality of information recording mediums are selected and extracted to generate the integrated reproducing procedure information. Thus, the integrated reproducing procedure information can be recorded so as to sequentially reproduce a plurality of recording information in accordance with desired reproducing procedures and across the boundary. Therefore, the recording information can be reproduced in variety manners.

The above object of the present invention can be achieved by a computer data signal of the present invention embodied in a carrier wave and representing a series of instructions which cause a computer to perform steps to execute a recording process in an information reproducing apparatus for reproducing recording information from an information recording medium in which integrated reproducing procedure information is recorded in an information recording medium in which recording information is recorded together with reproducing procedure information indicating at least one reproducing procedure to reproduce the recording information, said integrated reproducing procedure information indicating at least one reproducing procedure to sequentially reproduce a plurality of recording information including recording information recorded in other information recording medium. The steps are provided with: a selecting step for selecting any one of the integrated reproducing procedure information from a plurality of information recording mediums; an acquiring step for acquiring the reproducing procedure information from any one of said plurality of information recording mediums, said reproducing procedure information corresponding to at least one reproducing procedure indicated by the selected integrated reproducing procedure information; and a reproducing step for reproducing the recoding information in accordance with the reproducing procedures indicated by the acquired reproducing procedure information.

According to the present invention, the integrated reproducing procedure information is generated on the basis of the reproducing procedure information that correspond to a plurality of recording information recorded in a plurality of information recording mediums, and recoded in the information recording medium. Therefore, when the recording information is reproduced on the basis of the integrated reproducing procedure information, a plurality of recording information can be sequentially reproduced in a plurality of information recording mediums in accordance with desired reproducing procedures and across the boundary. Therefore, the recording information can be reproduced in variety manners.

BRIEF DESCRIPTION OF THE DRAWINGS

FIG. 9 is a diagram showing an example of an integrated reproduction list;

DESCRIPTION OF THE PREFERRED EMBODIMENTS

Next, preferred embodiments of the present invention will be described with reference to the accompanying drawings.

In the present embodiment, the present invention is employed for generating a reproduction list for sequentially reproducing each of audio information and video information from a plurality DVDs that are information recording mediums in which the audio information and video information are recorded respectively in individual regions, and for sequentially reproducing each of the information irrespective of the audio information or the video information.

(I) Embodiments of Each Recording Standard

Prior to describing the preferred embodiments according to the present invention, a recording format in the audio recording standard and the video recording standard that are a premise of the preferred embodiments will be described with reference to FIG. 1 and FIG. 2.

The audio and video recording standards have common structures in basic recording formal with the exception of the fact that an attribute of information to be recorded is audio information or video information. In the following description, these standards will be described in common as recording standards.

Figure 1:
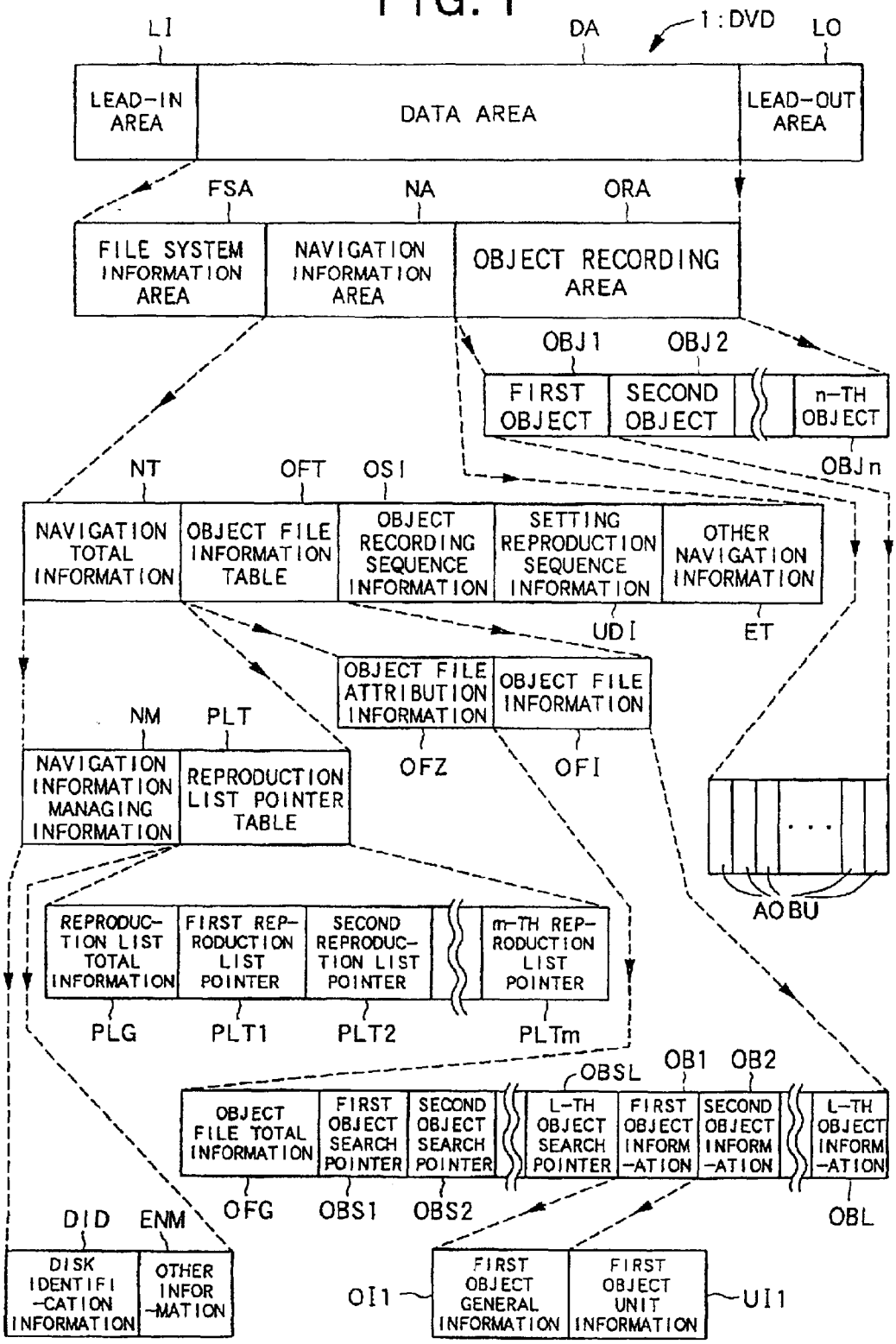
FIG. 1 is a diagram showing a physical format in a DVD recording standard.

FIG. 1 is a diagram for showing a physical format in a DVD after either of the audio information or video information (hereinafter, simply referred to as recording information) is recorded on the basis of each of the recording standards (i.e., specifically, a physical format for showing a recording positions or the like in the DVD of the respective recording information). FIG. 2 is a diagram for showing a logical recording format generated so as to control the reproduction manner of the recording information recorded in the DVD (i.e., specifically, connection of the respective information upon reproduction and the recording positions on the DVD of respective recording information to be connected).

At first, the physical format in each of the recording standards will be described with reference to FIG. 1. In FIG. 1, DVD 1 is a DVD capable of recording such as a DVD-R (DVD-Recordable) which can be rewritten only once or a DVD-RW (DVD-Recordable) which can be rewritten in plural times.

As shown in FIG. 1, according to each of the recording standards, a lead-in area LI, a data area DA and a lead-out area LO are formed from its inner radius in the DVD 1. In the lead-in-area LI, starting information or the like, which is controlling information to start reproduction of the recording information in the DVD is recorded. In the data area DA, reproduction controlling information to control the recording information to be reproduced in practice and the reproduction manner of the recording information is recorded. The reproduction controlling information is specifically reproduction controlling information showing reproduction order of respective information constructing the recording information and reproduction time or recording positions on the DVD or the like. In the lead-out-area LO, termination information or the like, which is controlling information to terminate reproduction of the recording information is recorded.

Next, a file system information area FSA, a navigation information area NA and an object recording area ORA are formed in the above data area DA.

Among the above areas, in the object recording area ORA a plurality of objects which are the recording information itself to be recorded are recorded. Each of the objects is defined as audio object (AOB) when recording information is audio information or defined as video object (VOB) when recording information is video information. In this case, a series of the recording information, which is recorded during a period from recording is commenced once until it is terminated, corresponds to one recording object just after the recording is terminated. In other words, the objects are formed in the object recording area ORA one by one every time a series of the recording information is completely recorded.

Alternatively, FIG. 1 shows a state that n pieces of the objects are recorded as a first object OBJ1 to OBJn with being numbered, respectively.

Additionally, in a logical format to be described later, a series of the objects which are recorded in the DVD 1 during a period from recording is commenced once until it is terminated, is referred to as a program. The term "program" is used when recording information is video information, and a term "track" is used when recording information is audio information.

Next, one object is comprised of a plurality of object units OBU. Each of the object units is defined as audio object unit (AOBU) when the recording information is audio information and defined as video object unit VOBU when the recording information is video information. In this case, the object unit OBU is recorded by segmenting the object for every period of time (for example, for every second) upon recording.

Alternatively, upon recording of the recording information, this object unit OBU becomes the minimum unit for edition or deletion of the object.

On the other hand, in the navigation information area NA in the data area DA, the reproduction controlling information is recorded as the navigation information to control the reproduction manner of the recording information recorded in the object recording area ORA to be described later.

Further, in the file system information area FSA, system information is recorded to store the above navigation information by hierarchical structure in filling format in the navigation information area NA.

Next, as the navigation information in the navigation information area NA, navigation total information NT, an object file information table OFT, object recording sequence information OSI, setting reproduction sequence information UDI and other navigation information ET are recorded.

Among the above information, the navigation total information NT is comprised of navigation information managing information NM, which is also called General Information (GI), and a reproduction list pointer table PLT. The navigation information managing information NM is total information of the DVD 1 for managing a storing position (recording position) in respective sequences in the navigation information area NA or in the navigation information area NA of the information table, and a recording starting position of the object recording area ORA or the like. The reproduction list pointer table PLT indicates a corresponding relation between the navigation information stored in the setting reproduction sequence information UDI and a reproduction list (referred to as play list (PL) in each of the recording standards) to be described later.

Next, the object file information table OFT is comprised of object file attribution information OFZ and object file information OFI. The object file attribution information OFZ comprises variety of objects to be recorded in the object recording area ORA and the attribution information related to this variety or the like. The variety of objects indicates that objects to be recorded in the object recording area ORA is an audio object or a video object in the case of the present embodiment. The object file information OFI comprises a reproduction start time and a reproduction termination time of respective objects, which are the ones in which a head of the first object OBJ1 is defined as a start point, and the information related to them, or the like.

Further, in the object file information OFI, various information related to one or a plurality of the above objects recorded on the DVD 1 is recorded. Specifically, the various information is comprised of object file total information OFG, L pieces of object search pointers OBS (L is the number of the objects, which are recorded in the DVD 1) and L pieces of object information OB (namely, as many as the object search pointer OBS). The object file total information OFG includes total number or the like on the DVD 1 of the object at the moment. The address information of heads of respective objects to be searched (reproduced) in the reproduction processing or the like to be described later, are described in the object search pointers OBS. The address information or the like indicating a recording position on the DVD 1 of heads of respective objects are described in the reproduction processing or the like in the object information OB.

Furthermore, respective object information OB are comprised of object general information OI and object unit information UI. The object general information OI comprises a reproduction start time and a reproduction termination time of respective objects and the information related to them. The object unit information UI comprises information such as a reproduction time of the object unit OBU constructing respective objects, a recording start address or a size thereof or the like.

Next, the object recording sequence OSI is referred to as an original program chain (ORG-PGC) in each of the recording standards. The object recording sequence OSI is information indicating a recording sequence of respective objects. Namely, it indicates in what order, what recording information is recorded in the DVD 1 as the object in the beginning of recording.

Additionally, the above described object file information table OFT and the object recording sequence OSI are newly generated, updated and recorded every time a new object is recorded in the DVD 1. Due to these information, a user is capable of reproducing them by the order and the reproduction time as same as those in the case that respective objects are recorded.

On the other hand, the setting reproduction sequence information UDI is referred to as a user defined program chain (UD-PGC) in each of the recording standards. The user generates one or plural setting reproduction sequence information UDI as reproducing procedure information in order to reproduce logically all or a part of the recorded objects in a mutual, free and original combination. The setting reproduction sequence information UDI are recorded as the reproducing procedure information with being numbered every time the user newly sets them. In this case, the user defined program chain is associated with the reproduction list described above.

Further, other navigation information ET is comprised of the information necessary for controlling reproduction in addition to the above described respective navigation information.

The navigation information managing information NM is comprised of: disk identification information DID including text information to identify the DVD 1 itself or the other DVD; and other information EN, which is information necessary for the navigation information managing information NM.

The disk identification information DID is defined as information to be included arbitrarily under each recording standard. Therefore, a recording area for the disk identification information DID is always formed in all kinds of DVDs while the disk identification information DID itself is not always recorded in the recording area.

Next, pointer information is recorded as a reproduction list pointer table PLT. The pointer information shows a corresponding relation between the number of one or a plurality of the above setting reproduction sequence information UDI, which are recorded on the DVD 1 at the moment, and the number of the reproduction list set by the user. Specifically, the reproduction list pointer table PLT is comprised of reproduction list total information PLG and a first to m-th reproduction list pointers PLT 1 to PLT m. The play list total information PLG includes a final address or the like in a region on the DVD 1 where the total number at the moment of the pointer information and the reproduction list pointer table PLT are recorded. The reproduction list pointers PLT 1 to PLT m indicate the numbers of the setting reproduction sequence information UDI, which are associated with the first to the m-th reproduction lists set by the user in the above setting reproduction sequence information UDI, respectively.

Next, a logical format for logically controlling a reproduction manner upon reproducing the recording information, which is recorded in the DVD 1 in accordance with the above described physical format, will be described with reference to FIG. 2. The reproduction manner includes the reproduction order or a range of the recording information to be reproduced in the recording information.

Figure 2:
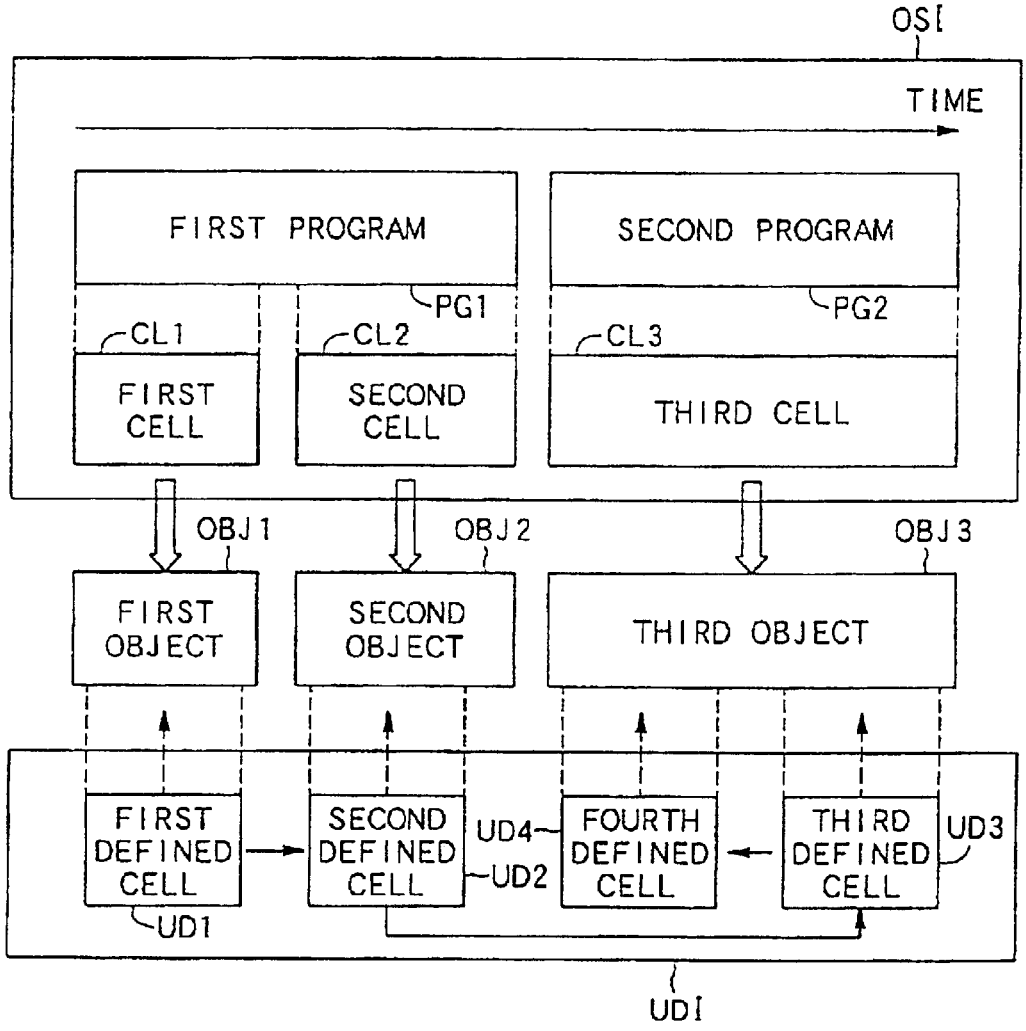
FIG. 2 is a diagram showing a logical format in the DVD recording standard.

FIG. 2 is a diagram for showing the logical format in a hierarchical structure. However, the recording information on the DVD 1 is recorded in a manner as shown in FIG. 1 and the logical format is obtained as a result that a range and a reproduction order of the recording information to be reproduced are described by using the above respective navigation information in a hierarchical structure, as described above.

At first, a logical format of the above object recording sequence information OSI will be described.

As described above, the object recording sequence information is information indicating a recording sequence of respective objects. However, in the case of reproducing the objects on the basis of the object recording sequence information OSI, the user may be allowed only to reproduce the objects in an order of recording, so that there is only one reproduction manner.

In other words, a first program PG1 is recorded prior to a second program PG2 in FIG. 2. However, in this case, a reproduction order capable of being set as the object recording sequence information OSI has only an order from the first program PG1 to the second program PG2. The first program PG1 is a program corresponds to a series of the objects to be recorded in the DVD 1 during a period from recording is commenced once until it is terminated as described above.

Further, one program PG is logically comprised of one or a plurality of cells CL. The cells CL are all or a part of one program PG. In one cell CL, the recording information is standardized such that they should be successive. In other words, one program PG is comprised of one cell CL or more.

Assuming that, for example, a broadcast program for an hour is recorded in the DVD 1 as the object, one program PG is comprised of only one cell CL as shown in the program PG2 and the third cell CL3 of FIG. 2 in this state.

On the other hand, in the case that the object recording sequence OSI is set in such a manner that the program PG is divided before and after a part of the formed one program PG so that a part of the formed one program PG is not capable of being reproduced after the recording, it is only standardized that the cell CL is divided before and after a part, which is not capable of being reproduced in the each of the recording standards (refer to the first program PG1, the first cell CL1 and the second cell CL2 in FIG. 2). For example, the case corresponds to a case that the object corresponding to a period of a commercial message during the broadcast program has been on air is deleted so that it cannot be reproduced or the like.

Next, in a relation between respective cells CL physically configured, and respective objects logically formed, one cell CL is ordinary associated with one object as shown in FIG. 2. Therefore, for example, if one cell CL is deleted on the object recording sequence information OSI, a corresponding object also becomes unnecessary to be reproduced.

Further, a logical format of the above setting reproduction sequence information UDI will be described.

As described above, the setting reproduction sequence information UDI (user defined program chain) is also referred to as a reproduction list in each of the recording standards. The user sets and records the setting reproduction sequence information UDI so that the user can arbitrarily reproduce a part or all of a plurality of the objects in an arbitrary order.

In the above case, the above described program PG does not exist in the setting reproduction sequence information UDI. Further, it is possible to set a plurality of setting reproduction sequence information UDI.

Next, one setting reproduction sequence information UDI is logically comprised of one or a plurality of defined cells UD (sometimes referred to as logical cells) as shown in FIG. 2. In this case, one defined cell UD comprises information, which logically shows reproduction segments arbitrarily set by the user (reproduction segments as a part of the respective objects) and a reproduction order between respective reproduction segments. This defined cell UD is set so as to reproduce respective objects with making reference to them. This is an artifice in a standard to realize a plurality of reproduction manners with changing original objects as little as possible.

More specifically, as shown in FIG. 2, logically setting a first defined cell UDI, a second defined cell UD2, a third defined cell UD3 and a fourth defined cell UD4, then, one setting reproduction sequence information UDI is comprised of defining these defined cells so that they are reproduced in such an order that the first defined cell UDI, the second defined cell UD2, the third defined cell UD3, and the fourth defined cell UD4. The first defined cell UDI designates a part of the first object OBJ1 as a reproduction segment. The second defined cell UD2 designates a part of the second object OBJ1 as a reproduction segment. The third defined cell UD3 and the fourth defined cell UD4 designate various parts of the third object OBJ3, respectively, as reproduction segments.

In the case where two or more definition cells UDs are defined for one object, part of the objects may be used in common in a plurality of definition cells UDs.

Next, the specific contents of the above object recording sequence information OSI that may be mainly used during reproduction, the sequence information being included in each item of the above described navigation information, will be described by way of example shown in FIG. 3.

Figure 3:
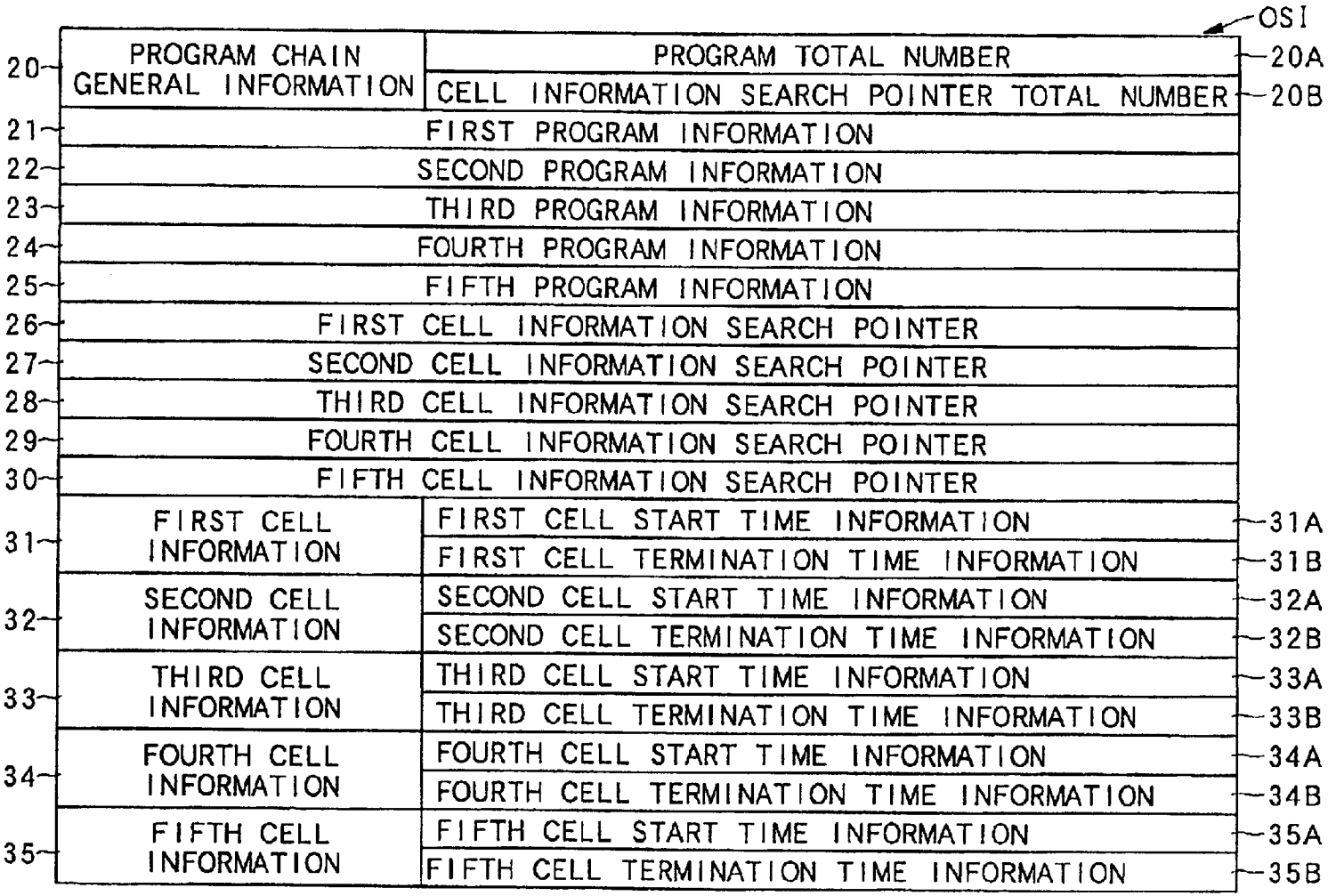
FIG. 3 is a diagram showing an example of object recording sequence information.

FIG. 3 exemplifies the object recording sequence information OSI described so that five programs, i.e., first to fifth programs, are reproduced in ascending order (in other words, so that these programs are recorded in the DVD 1 in ascending order) in a logical format shown in FIG. 2.

In the case of the above example, as shown in FIG. 3, the object recording sequence information OSI includes a program chain general information 20, first program information 21, second program information 22, third program information 23, fourth program information 24, fifth program information 25, a first cell information search pointer 26, a second cell information search pointer 27, a third cell information search pointer 28, a fourth cell information search pointer 29, a fifth cell information search pointer 30, first cell information 31, second cell information 32, third cell information 33, fourth cell information 34 and fourth cell information 35. The program chain general information 20 includes a track program number 20A (its value is "5"), in which the total number of the programs PG recorded in the DVD 1 is described, and a cell information search pointer total number 20B (its value is "5"), in which the total number of the corresponding cell information search pointers is described. The total number of the cells CL included in the first program is described in the first program information 21. The total number of the cells CL included in the second program is described in the second program information 22. The total number of the cells CL included in the third program is described in the third program information 23. The total number of the cells CL included in the fourth program is described in the fourth program information 24. The total number of the cells CL included in the fifth program is described in the fifth program information 25. A recording position on the DVD 1, in which the first cell information 31 to be described later is described, is described in the first cell information search pointer 26. A recording position on the DVD 1, in which the second cell information 32 to be described later is described, is described in the second cell information search pointer 27. A recording position on the DVD 1, in which the third cell information 33 to be described later is described, is described in the third cell information search pointer 28. A recording position on the DVD 1, in which the fourth cell information 34 to be described later is described, is described in the fourth cell information search pointer 29. A recording position on the DVD 1, in which the fifth cell information 35 to be described later is described, is described in the fifth cell information search pointer 30. The first cell information 31 includes first cell start time information 31A, in which a reproduction start time of the first cell corresponding to the first program is described, and first cell termination time information 31B, in which a reproduction termination time of the first cell is described. The second cell information 32 includes second cell start time information 32A, in which a reproduction start time of the second cell corresponding to the second program is described, and second cell termination time information 32B, in which a reproduction termination time of the second cell is described. The third cell information 33 includes third cell start time information 33A, in which a reproduction start time of the third cell corresponding to the third program is described, and third cell termination time information 33B, in which a reproduction termination time of the third cell is described. The fourth cell information 34 includes fourth cell start time information 34A, in which a reproduction start time of the fourth cell corresponding to the fourth program is described, and fourth cell termination time information 34B, in which a reproduction termination time of the fourth cell is described. The fifth cell information 35 includes fifth cell start time information 35A, in which a reproduction start time of the fifth cell corresponding to the fifth program is described, and fifth cell termination time information 35B, in which a reproduction termination time of the fifth cell is described.

Next, object information OB formed according to the object recording sequence information OSI having the contents shown in FIG. 3 will be described by way of example shown in FIG. 4.

The contents of the object information OB are referred to during reproduction of each object.

Figure 4:
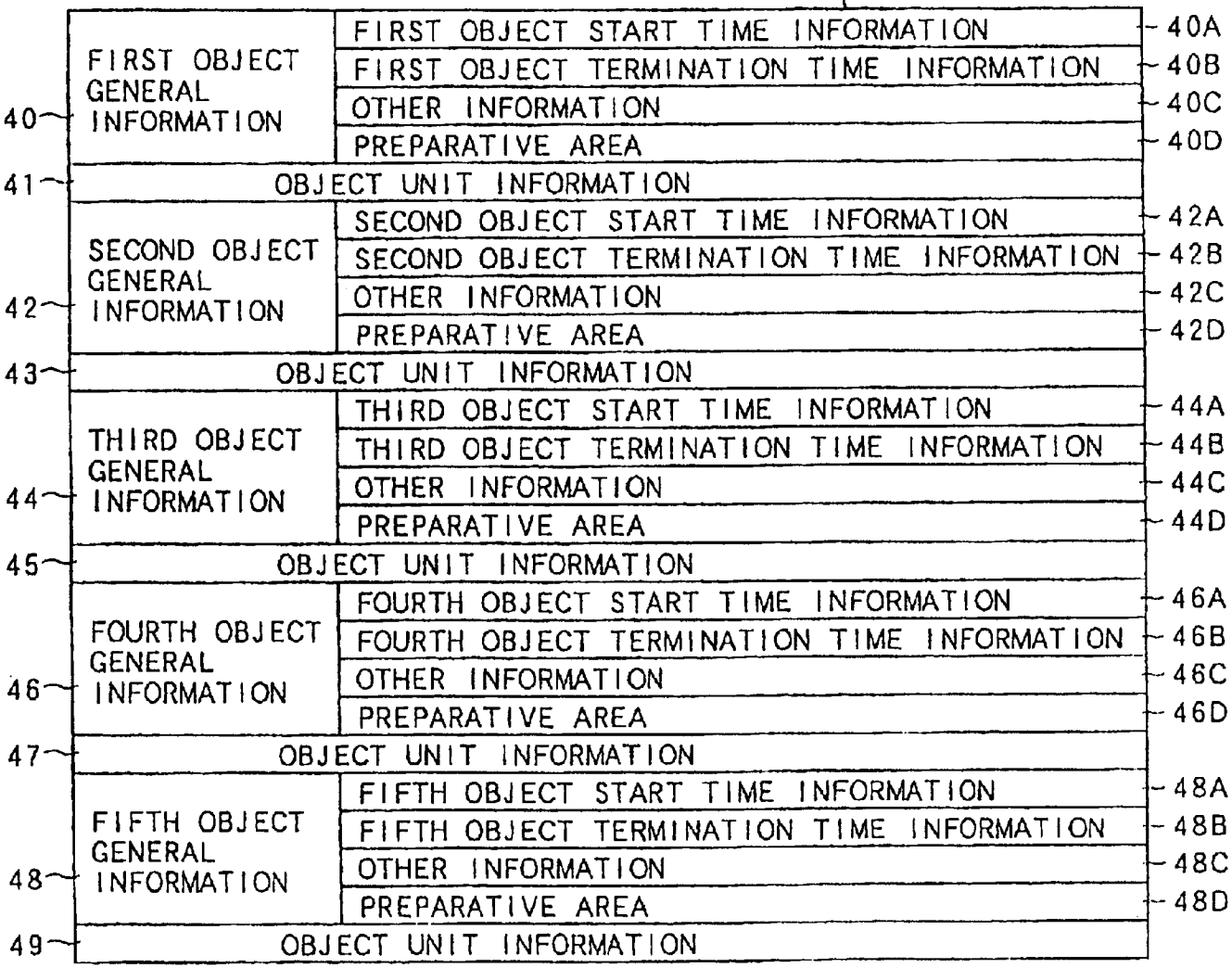
FIG. 4 is a diagram showing an example of object information.

FIG. 4 is a diagram illustrating the contents of object information OB that corresponds to the object recording sequence information OSI shown in FIG. 3 by showing an example of the logical format similar to that shown in FIG. 3.

As shown in FIG. 4, the object information OB, which corresponds to the object recording sequence information OSI shown in FIG. 3, includes first object general information 40, object unit information 41, second object general information 42, object unit information 43, third object general information 44, object unit information 45, fourth object general information 46, object unit information 47 and fifth object general information 48 and object unit information 49. The first object general information 40 is comprised of reproduction start time information 40A of the first object corresponding to the first program, reproduction termination time information 40B of the first object, other information 40C including other information necessary for reproduction of the first object, and a preparative area 40D. The first object unit information 41 is the object unit information UI in associated with the first object. The second object general information 42 is comprised of reproduction start time information 42A of the second object corresponding to the second program, reproduction termination time information 42B of the second object, other information 42C including other information necessary for reproduction of the second object, and a preparative area 42D. The second object unit information 43 is the object unit information UI in associated with the second object. The third object general information 44 is comprised of reproduction start time information 44A of the third object corresponding to the third program, reproduction termination time information 44B of the third object, other information 44C including other information necessary for reproduction of the third object, and a preparative area 44D. The third object unit information 45 is the object unit information UI in associated with the third object. The fourth object general information 46 is comprised of reproduction start time information 46A of the fourth object corresponding to the fourth program, reproduction termination time information 46B of the fourth object, other information 46C including other information necessary for reproduction of the fourth object, and a preparative area 46D. The fourth object unit information 47 is the object unit information UI in associated with the fourth object. The fifth object general information 48 is comprised of reproduction start time information 48A of the fifth object corresponding to the fifth program, reproduction termination time information 48B of the fifth object, other information 48C including other information necessary for reproduction of the fifth object, and a preparative area 48D. The fifth object unit information 49 is the object unit information UI in associated with the fifth object.

(II) Embodiments of Integrated Reproduction List Recording Standards

Next, a recording format including an integrated reproduction list of the present invention that is plotted out premised on each of the recording standards will be described with reference to FIGS. 5 to 9.

Figure 5:
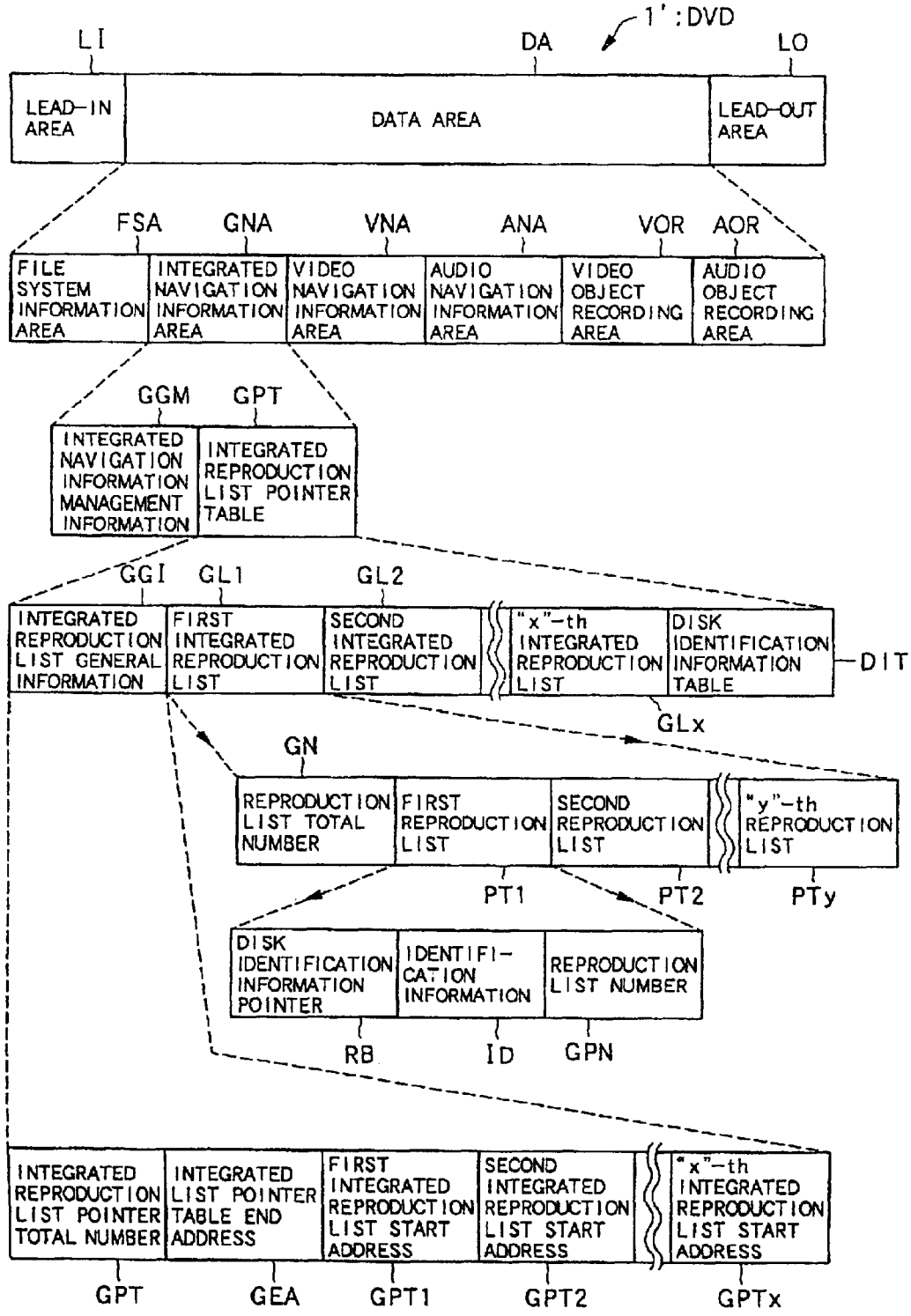
FIG. 5 is a diagram showing a physical format including an integrated reproduction list.
Figure 6A:
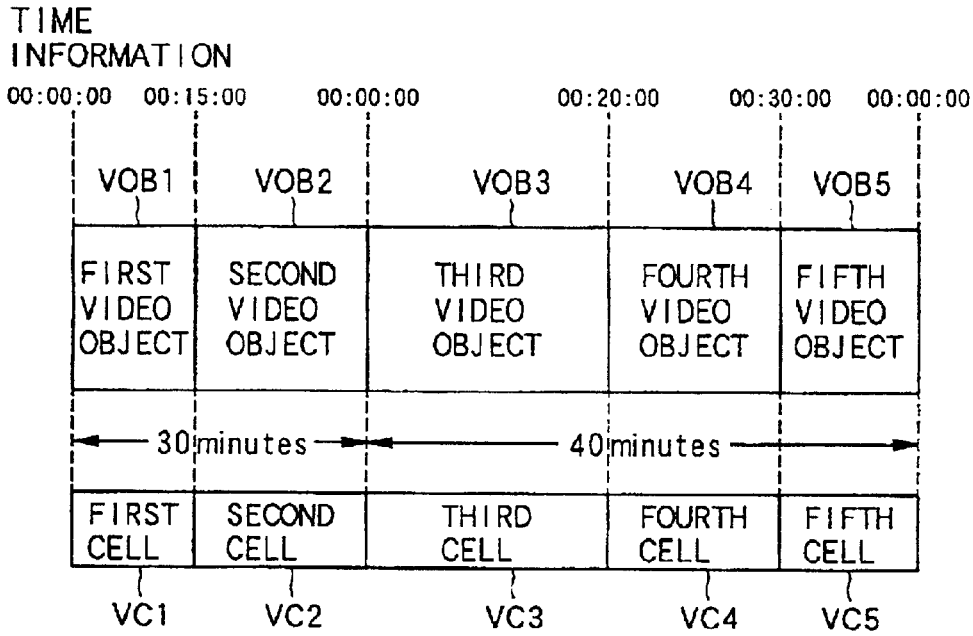
FIG. 6A is a diagram showing an example of a logical format of information recorded in a first DVD.
Figure 6B:
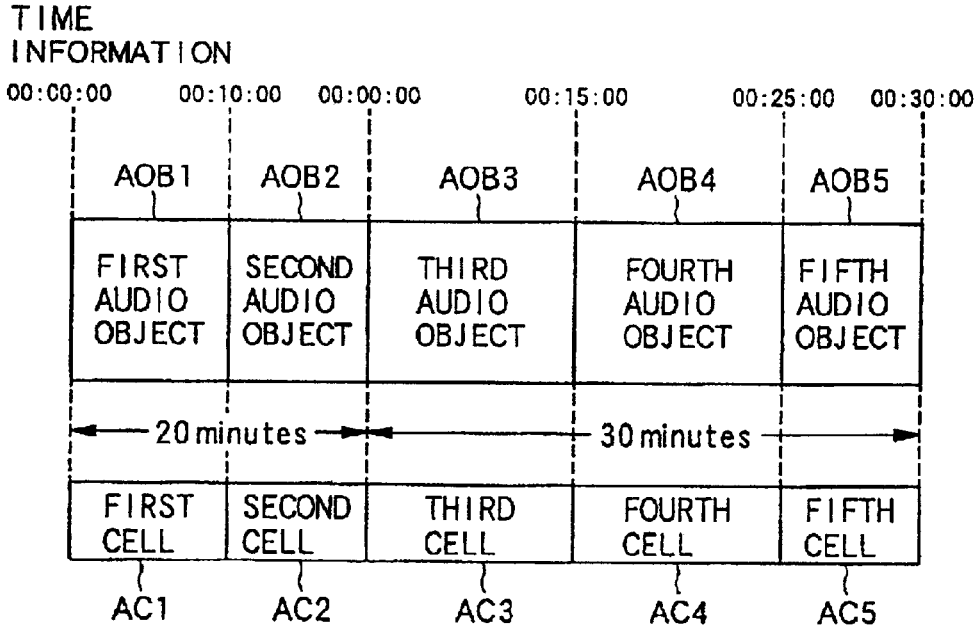
FIG. 6B is a diagram showing an example of a logical format of information recorded in a second DVD.
Figure 7:
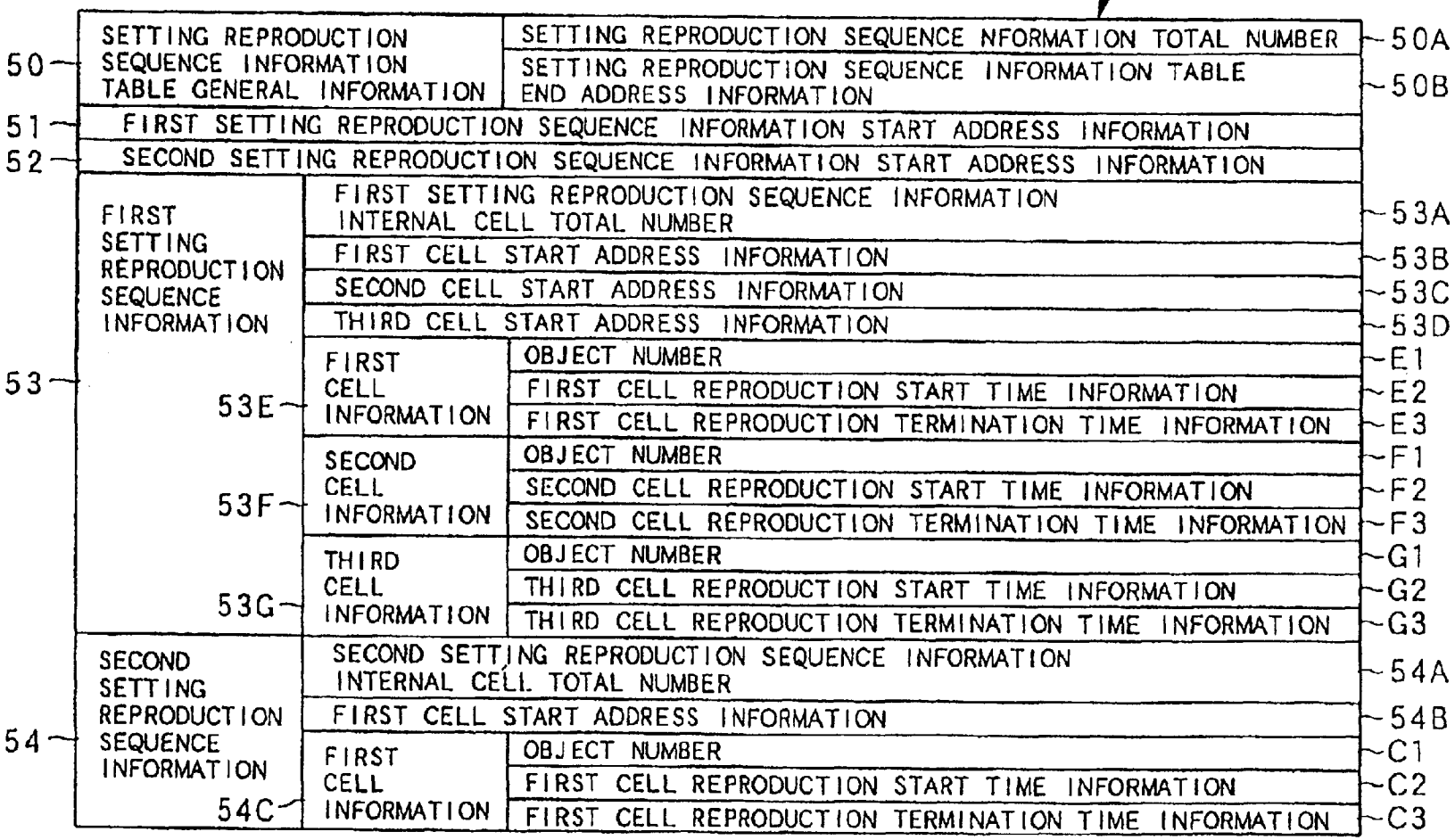
FIG. 7 is a diagram showing example (I) of setting reproduction sequence information.
Figure 8:
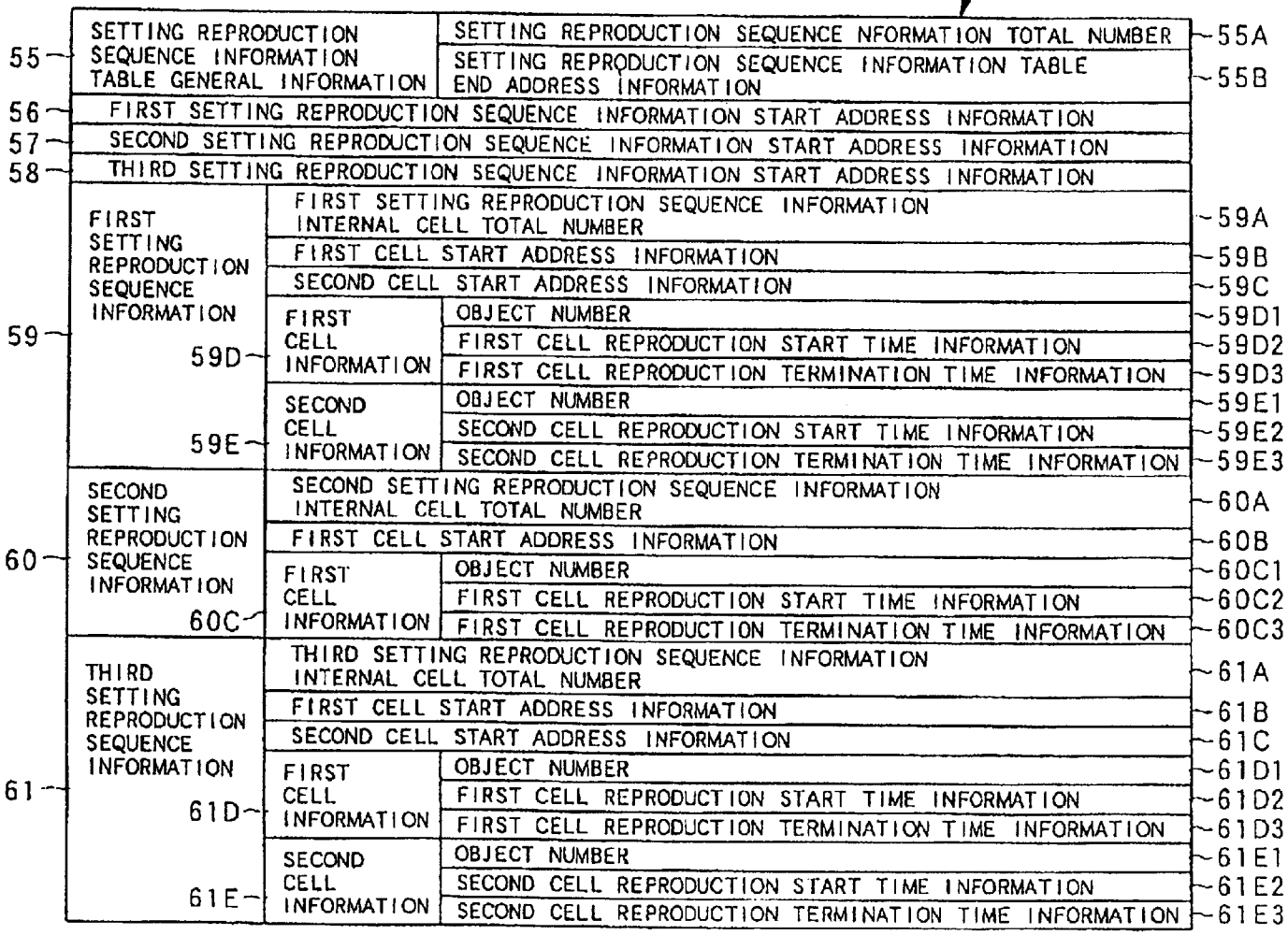
FIG. 8 is a diagram showing example (II) of setting reproduction sequence information.

FIG. 5 is a diagram showing a physical recording format in a DVD after the integrated reproduction list has been recorded (specifically, a physical format indicating a recording position or the like in the DVD containing each of recording information). FIGS. 6A and 6B are diagrams showing examples of a logical format generated so as to control a reproduction manner of audio information and video information recorded in two DVDs, each of which is different from DVD 1' shown in FIG. 5. FIG. 7 is a diagram showing an example of the above setting reproduction sequence information UDI set with respect to only video information in the case of the above example. FIG. 8 is a diagram showing an example of the above setting reproduction sequence information UDI set with respect to only audio information in the case of the above example. FIG. 9 is a diagram showing integrated list general information described later, containing the integrated reproduction list and an example of each of the integrated reproduction lists according to the present invention when the video information and the audio information, which are recorded astride the two DVDs, are set all together in the case of the above example.

The integrated reproduction list as an integrated reproducing procedure information denotes the above reproduction list set in order to sequentially reproduce part or all of the audio information and video information in combination using the two DVDs, in the case where the audio information and video information are recorded in the two DVDs respectively.

As shown in FIG. 5, in the embodied integrated reproduction list recording standards, in the DVD 1', from its inner radius side, each of the lead-in area LI, data area DA and lead-out area LO is formed in a manner similar to the case shown in FIG. 1.

Next, in the above data area DA, a file system information area FSA, an integrated navigation information area GNA, a video navigation area VNA, an audio navigation area ANA, a video object recording area VOR, and an audio object recording area AOR are formed. The file system information area FSA is similar to that shown in FIG. 1. The integrated navigation information area GNA contains the integrated reproduction list of the preferred embodiment with respect to recording information recorded in the two DVDs. The video navigation area VNA is a navigation information area NA shown in FIG. 1 concerning only the video information recorded in DVD 1'. The audio navigation area ANA is the navigation information area NA concerning the audio information, shown in FIG. 1. The video object recording area VOR is an area in which a plurality of objects containing only video information are recorded in a manner similar to that of the object recording area ORA shown in FIG. 1. The audio object recording area AOR is an area in which a plurality of objects containing only audio information are recorded in a manner similar to that of the object recording area ORA.

In the above integrated navigation information area GNA, integrated navigation information management information GGM and an integrated reproduction list pointer table GPT are recorded as navigation information.

Among them, the integrated navigation information management information GGM is integrated navigation information management information that is comprehensive information on a DVD 1' managing each of the sequence information in the integrated navigation information area GNA or a storage position (recording position) of an information table in the integrated navigation information area GNA. Namely, the integrated navigation information management information GGM is a management information similar to the navigation information management information NM shown in FIG. 1.

In addition, in an integrated reproduction list pointer table GPT, there is stored information or the like showing a correspondence of the integrated reproduction list and the reproduction list stored in the video navigation information area VNA or the audio navigation information area ANA.

More specifically, the integrated reproduction list pointer table GPT includes an integrated reproduction list general information GGI, a plurality of integrated reproduction lists GL1 to GLx (the number of the lists is assumed to be "x"), and a disk identification information table DIT.

Further, in the integrated reproduction list general information GGI, comprehensive information on the integrated reproduction lists is stored. Specifically, as exemplified later, there are contained an integrated reproduction list total number GPT, a reproduction list pointer table end address GEA, a first integrated reproduction list start addresses GPT 1 to the x-th integrated reproduction list start addresses GPT x that are start addresses in a region on the DVD 1' in which each integrated reproduction list is recorded. The number of the integrated reproduction list start addresses is "x", which is equal to the number of integrated reproduction lists GL.

Furthermore, each of the integrated reproduction lists GL, as exemplified later, includes a reproduction list total number GN, and a plurality of reproduction fists PT 1 to PT y. The number of the reproduction lists is assumed to be "y". The reproduction list total number GN is the number of reproduction lists contained in each of the integrated reproduction lists GL. The reproduction lists PT 1 to PT y are reproduction lists contained in one integrated reproduction list GL. The one integrated reproduction list GL includes any of reproduction lists for the video information contained in the video navigation information area VNA, reproduction lists for the audio information stored in the audio navigation information area ANA, and reproduction lists recorded in the other DVD.

In each of the reproduction lists PT, there is stored indicative information indicating each of the reproduction lists to be contained in the integrated reproduction list GL. Specifically, as exemplified later, there are contained a disk identification information pointer RB, identification information ID, and a reproduction list number GPN that is the corresponding number of reproduction list.

On the other hand, in the disk identification information table DIT, there is stored disk identification information in a form of a table. The disk identification information is information to identify a plurality of DVDs (two DVDs in the preferred embodiment) in which recording information to be reproduced by using the integrated reproduction list of the preferred embodiment are recorded respectively.

Next, each of information contained in the above described integrated reproduction list pointer table GPT, each of information to be contained in the reproduction list for the video information, and each of information to be contained in the reproduction list for the audio information, will be described with reference to FIG. 7 to FIG. 9 and an example shown in FIGS. 6A and 6B.

FIGS. 6A and 6B show specific examples of a logical format for each object stored in a data area DA shown in FIG. 5 with respect to each DVD in which recording information to be reproduced is recorded separately.

At first, an example shown in FIG. 6A will be described. In a DVD in which video information is recorded in a logical format indicated in the example, first to fifth video objects VOB1 to VOB5 are recorded in order in a video object recording area VOR shown in FIG. 1.

Reproduction time information of each object on object recording sequence information OSI in the DVD, that is, reproduction time information corresponding to recording time information when each object shown in FIG. 6A is recorded, indicates that a first video object VOB1 should be reproduced between "0 hours, 0 minutes and 0 seconds" and "0 hours, 15 minutes and 0 seconds". Also, the reproduction time information indicates that a second video object VOB2 should be reproduced between "0 hours, 15 minutes and 0 seconds" and "0 hours, 30 minutes and 0 seconds". In other words, on object recording sequence information OSI concerning the video information, the first and second video objects VOB1 and VOB2 should be sequentially reproduced in order within 30 minutes in reproduction time.

In addition, with respect to the other video objects VOB, similarly, the reproduction time information indicates that a third video object VOB3 should be reproduced between "0 hours, 0 minutes and 0 seconds" and "0 hours, 20 minutes and 0 seconds". Also, the reproduction time information indicates that a fourth video object VOB4 should be reproduced between "0 hours, 20 minutes and 0 seconds" and "0 hours, 30 minutes and 0 seconds". Further, the reproduction time information indicates that a fifth video object VOB5 should be reproduced between "0 hours, 30 minutes and 0 seconds" and "0 hours, 40 minutes and 0 seconds". In other words, the object recording sequence information OSI concerning the video information indicates that the third to fifth video objects VOB3 to VOB5 should be reproduced sequentially within 40 minutes in reproduction time.

On the other hand, in each object shown in FIG. 6A, first to fifth cells VC1 to VC5 relevant to the video information are set so as to correspond to each other one by one (refer to FIG. 2).

Next, an example shown in FIG. 6B will be described. In a DVD in which audio information is recorded in a logical format indicated in the example, with respect to an audio object AOB recorded in the audio object recording area AOR corresponding to the object recording area PRA shown in FIG. 1, similarly, the reproduction time information indicates that a first audio object AOB1 should be reproduced between "0 hours, 0 minutes and 0 seconds" and "0 hours, 10 minutes and 0 seconds". Also, the reproduction time information indicates that a second audio object AOB2 should be reproduced between "0 hours, 10 minutes and 0 seconds" and "0 hours, 20 minutes and 0 seconds".

In other words, on the object recording sequence information OSI concerning the audio information in the DVD, the first and second audio objects AOB1 and AOB2 should be reproduced sequentially in order within 20 seconds in reproduction time.

Further, with respect to the other audio objects AOB, similarly, the reproduction time information indicates that a third audio object AOB3 should be reproduced between "0 hours, 0 minutes and 0 seconds" and "0 hours, 15 minutes and 0 seconds". Also, the reproduction time information indicates that a fourth audio object AOB4 should be reproduced between "0 hours, 15 minutes and 0 seconds" and "0 hours, 25 minutes and 0 seconds". Further, the reproduction time information indicates that a fifth audio object AOB5 should be reproduced between "0 hours, 25 minutes and 0 seconds" and "0 hours, 30 minutes and 0 seconds".

In other words, on the object recording sequence information OSI concerning the audio information, the third to fifth audio objects AOB3 to AOB5 should be reproduced sequentially in order within 30 minutes in reproduction time.

On the other hand, in each object shown in FIG. 6B, first to fifth cells AC1 to AC5 relevant to the audio information are set so as to correspond to each other one by one (refer to FIG. 2).

Next, each of the reproduction lists and integrated reproduction lists will be specifically described with reference to an example shown in FIGS. 6A and 6B.

First, an example of each of information to be contained in a reproduction list for video information recorded in one DVD (hereinafter, the DVD in which the video information is recorded is referred to a first DVD.) will be described with reference to FIG. 7.

FIG. 7 illustrates setting reproduction sequence information UDI containing video reproduction lists including a first reproduction list and a second reproduction list. The first reproduction list is formed so as to reproduce part or all of the first video object VOB1, part or all of the third video object VOB3, and part or all of the fifth video object VOB5 in the example shown in FIG. 6A. The second reproduction list is formed so as to reproduce part or all of the fourth video object VOB4 in the example shown in FIG. 6A.

As shown in FIG. 7, the setting reproduction sequence information UDI on video information having the above-mentioned contents is composed of: a setting reproduction sequence table general information 50; first setting reproduction sequence information start address information 51; second setting reproduction sequence information start address information 52; first setting reproduction sequence information 53; and second setting reproduction sequence information 54. The setting reproduction sequence table general information 50 describes information concerning the setting reproduction sequence information UDI as a whole. The first setting reproduction sequence information start address information 51 indicates a recording start position on the DVD 1 of the first setting reproduction sequence information 53 corresponding to the first reproduction list. The second setting reproduction sequence information start address information 52 indicates a recording start position on the DVD 1 of the second setting reproduction sequence information 54 corresponding to the second reproduction list. The first setting reproduction sequence information 53 corresponds to the first reproduction list. The second setting reproduction sequence information 54 corresponds to the second reproduction list.

The setting reproduction sequence information table general information 50 is composed of: a setting reproduction sequence information total number 50A; and setting reproduction sequence information table end address information 50B. The setting reproduction sequence information total number 50A indicates a total number of setting reproduction sequence information contained in the setting reproduction sequence information UDI. Therefore, the value of setting reproduction sequence information total number 50A is 2 in FIG. 7. The setting reproduction sequence information table end address information 50B indicates a recording end position of setting reproduction sequence information UDI on the DVD 1.

Further, the first setting reproduction sequence information 53 is composed of: a first setting reproduction sequence information internal cell total number 53A; first cell start address information 53B; second cell start address information 53C; third cell start address information 53D; first cell information 53E; second cell information 53F; and third cell information 53G. The first setting reproduction sequence information internal cell total number 53A indicates a total number of cells (hereinafter referred to as a definition cell in FIG. 7 and FIG. 8) contained in the first setting reproduction sequence information 53. Therefore, the value of the first setting reproduction sequence information internal cell total number 53A is 3 in FIG. 7. The first cell start address information 53B indicates a recording start position on the first DVD of the first cell information 53E that is information on a first cell contained in the first setting reproduction sequence information 53. The second cell start address information 53C indicates a recording start position on the first DVD of the second cell information 53F that is information on a second cell contained in the first setting reproduction sequence information 53. The third cell start address information 53D indicates a recording start position on the first DVD of the third cell information 53G that is information on a third cell contained in the first setting reproduction sequence information 53. The first cell information 53E indicates the contents of a video object VOB that configures the first cell. The second cell information 53F indicates the contents of a video object VOB that configures the second cell. The third cell information 53G indicates the contents of a video object VOB that configure the third cell.

Furthermore, the first cell information 53E is composed of: an object number E1; first cell reproduction start time information E2; and first cell reproduction end time information E3. The object number E1 indicates the number of the video object VOB that configures the first cell. Therefore, the value of the object number E1 indicates "1" of a first video object VOB1 in this example. The first cell reproduction start time information E2 indicates a reproduction start time of the video information in the first video object VOB1 defined as the first cell. Therefore, the value of the first cell reproduction start time information E2 is defined as "0 hours, 0 minutes and 0 seconds", for example. The first cell reproduction end time information E3 indicates a reproduction end time of the video information. Therefore, the value of the first cell reproduction end time information E3 is defined as "0 hours, 14 minutes and 29 seconds", for example.

The second cell information 53F is composed of: an object number F1; second cell reproduction start time information F2; and second cell reproduction end time information F3. The object number F1 indicates the number of the video object VOB that configures the second cell. Therefore, the value of the object number F1 indicates "3" of a third video object VOB3. The second cell reproduction start time information F2 indicates a reproduction start time of video information in a third video object VOB3 defined as the second cell. Therefore, the value of the second cell reproduction start time information F2 is defined as "0 hours, 0 minutes and 0 seconds", for example. The second cell reproduction end time information F3 indicates a reproduction end time of the video information. Therefore, the value of the second cell reproduction end time information F3 is defined as "0 hours, 19 minutes and 29 seconds", for example.

Furthermore, the third cell information 53G is composed of: an object number G1; third cell reproduction start time information G2; and third cell reproduction end time information G3. The object number G1 indicates the number of the video object VOB that configures the third cell. Therefore, the value of the object number G1 indicates "5" of a fifth video object VOB5. The third cell reproduction start time information G2 indicates a reproduction start time of video information in a fifth video object VOB5 defined as the third cell. Therefore, the value of the third cell reproduction start time information G2 is defined as "0 hours, 30 minutes and 0 seconds", for example. The third cell reproduction end time information G3 indicates a reproduction end time of the video information. Therefore, the value of the third cell reproduction end time information G3 is defined as "0 hours, 39 minutes and 29 seconds", for example.

The second setting reproduction sequence information 54 is composed of: a second setting reproduction sequence internal cell total number 54A: first cell start address information 54B; and first cell information 54C. The second setting reproduction sequence internal cell total number 54A indicates a total number of cells contained in the second setting reproduction sequence information 54. Therefore, the value of the second setting reproduction sequence internal cell total number 54A is 1 in this example. The first cell start address information 54B indicates a recording start position on the first DVD of the first cell information 54C that is information on a first cell contained in the second setting reproduction sequence information 54. The first cell information 54C indicates the contents of a video object VOB that configures the first cell.

The first cell information 54C is composed of: an object number C1; a first cell reproduction start time information C2; and first cell reproduction end time information C3. The object number C1 indicates the number of the video object VOB that configures the first cell. Therefore, the value of the object number C1 indicates "4" of a fourth video object VOB4. The first cell reproduction start time information C2 indicates a reproduction start time of the video information in a fourth video object VOB4 defined as the first cell. Therefore, the value of the first cell reproduction start time information C2 is defined as "0 hours, 20 minutes and 0 seconds", for example. The first cell reproduction end time information C3 indicates a reproduction end time of the video information. Therefore, the value of the first cell reproduction end time information C3 is defined as "0 hours, 29 minutes and 29 seconds", for example.

Next, an example of each of information to be contained in a reproduction list for audio information recorded in another DVD (hereinafter, the DVD in which the audio information is recorded is referred to a second DVD.) will be described with reference to FIG. 8.

FIG. 8 illustrates setting reproduction sequence information UDI including a first reproduction list, a second reproduction list, and a third reproduction list as a reproduction list for audio information. The first reproduction list is formed so as to reproduce part or all of the third audio object AOB3 and part or all of the first audio object AOB1 in this order in the example shown in FIG. 6B. The second reproduction list is formed so as to reproduce only part or all of the second audio object AOB2 in the example shown in FIG. 6B. The third reproduction list is formed so as to reproduce part or all of the third audio object AOB3 and part or all of the fifth audio object AOB5 in this order in the example shown in FIG. 6B.

As shown in FIG. 8, the setting reproduction sequence information UDI on audio information having the above-mentioned contents is composed of: setting reproduction sequence information table general information 55; first setting reproduction sequence information start address information 56; second setting reproduction sequence information start address information 57; third setting reproduction sequence information start address information 58; first setting reproduction sequence information 59; and second setting reproduction sequence information 60. The setting reproduction sequence information table general information 55 describes information concerning the setting reproduction sequence information UDI as a whole. The first setting reproduction sequence information start address information 56 indicates a recording start position on the second DVD of the first setting reproduction sequence information 59 corresponding to the first reproduction list. The second setting reproduction sequence information start address information 57 indicates a recording start position on the second DVD of the second setting reproduction sequence information 60 corresponding to the second reproduction list. The third setting reproduction sequence information start address information 58 indicates a recording start position on the second DVD of the third reproduction sequence information 61 corresponding to the third reproduction list. The first setting reproduction sequence information 59 corresponds to the first reproduction list. The second setting reproduction sequence information 60 corresponds to the second reproduction list. The third setting reproduction sequence information 61 corresponds to the third reproduction list.

The Setting reproduction sequence information table general information 55 is composed of: a setting reproduction sequence information total number 55A; and setting reproduction sequence information table end address information 55B. The setting reproduction sequence information total number 55A indicates a total number of the setting reproduction sequence information contained in the setting reproduction sequence information UDI. Therefore, the value of setting reproduction sequence information total number 55A is 3 in this example. The setting reproduction sequence information table end address information 55B indicates a recording end position on the second DVD of the setting reproduction sequence information UDI.

Further, first setting reproduction sequence information 59 is composed of: a first setting reproduction sequence information internal cell total number 59A; first cell start address information 59B; second cell start address information 59C; first cell information 59D; and second cell information 59E. The first setting reproduction sequence information internal cell total number 59A indicates a total number of cells contained in the first setting reproduction sequence information 59. Therefore, the value of the first setting reproduction sequence information internal cell total number 59A is 2. The first cell start address information 59B indicates a recording start position on the second DVD of the first cell information 59D that is information on a first cell contained in the first setting reproduction sequence information 59. The second cell start address information 59C indicates a recording start position on the second DVD of second cell information 59E that is information on a second cell contained in the first setting reproduction sequence information 59. The first cell information 59D indicates the contents of an audio object AOB that configures the first cell. The second cell information 59E indicates the contents of an audio object AOB that configures the second cell.

Furthermore, first cell information 59D is composed of: an object number 59D1; first cell reproduction start time information 59D2; and first cell reproduction end time information 59D3. The object number 59D1 indicates the number of the audio object AOB that configures the first cell. Therefore, the value of object number 59D1 indicates "3" a third audio object AOB3. The first cell reproduction start time information 59D2 indicates a reproduction start time of audio information in the third audio object AOB3 defined as the first cell. Therefore, the value of the first cell reproduction start time information 59D2 is defined as "0 hours, 0 minutes and 0 seconds", for example. The first cell reproduction end time information 59D3 indicates a reproduction end time of the audio information. Therefore, the value of first cell reproduction end time information 59D3 is defined as "0 hours, 14 minutes and 29 seconds", for example.

The second cell information 59E is composed of: an object number 59E1; second cell reproduction start time information 59E2; and second cell reproduction end time information 59E3. The object number 59E1 indicates the number of the video object AOB that configures the second cell. Therefore, the value of the object number 59E1 indicates "1" of a first audio object AOB1. The second cell reproduction start time information 59E2 indicates a reproduction start time of audio information in a first audio object AOB1 defined as the second cell. Therefore, the value of second cell reproduction start time information 59E2 is defined as "0 hours, 0 minutes and 0 seconds", for example. The second cell reproduction end time information 59E3 indicates a reproduction end time of the audio information. Therefore, the value of the second cell reproduction end time information 59E3 is defined as "0 hours, 9 minutes and 29 seconds", for example.

Further the second setting reproduction sequence information 60 is composed of: a second setting reproduction sequence information internal cell total number 60A; first cell start address information 60B; and first cell information 60C. The second setting reproduction sequence information internal cell total number 60A indicates a total number of cells contained in the second setting reproduction sequence information 60. Therefore, the value of the second setting reproduction sequence information internal cell total number 60A is "1" in this example. The first cell start address information 60B indicates a recording start position on the second DVD of first cell information 60C that is information on the first cell contained in the second setting reproduction sequence information 60. The first cell information 60C indicates the contents of the audio object AOB that configures the first cell.

Furthermore, the first cell information 60C is composed of: an object number 60C1; first cell reproduction start time information 60C2; and first cell reproduction end time information 60C3. The object number 60C1 indicates the number of the audio object AOB that configures the third cell. Therefore, the value of the object number 60C1 indicates "2" of a second audio object AOB2. The first cell reproduction start time information 60C2 indicates a reproduction start time of the audio information in a second audio object AOB2 defined as the first cell. Therefore, the value of the first cell reproduction start time information 60C2 is defined as "0 hours, 10 minutes and 0 seconds", for example. The first cell reproduction end time information 60C3 indicates a reproduction end time of the audio information. Therefore, the value of the first cell reproduction end time information 60C3 is defined as "0 hours, 19 minutes and 29 seconds".

The third setting reproduction sequence information 61 is composed of: a third setting reproduction sequence internal cell total number 61A; first cell start address information 61B; second cell start address information 61C; first cell information 61D; second cell information 61E. The third setting reproduction sequence internal cell total number 61A indicates a total number of cells contained in the third setting reproduction sequence information 61. Therefore, the value of third setting reproduction sequence internal cell total number 61A is "2". The first cell start address information 61B indicates a recording start position on the second DVD of first cell information 61D that is information on a first cell contained in the third setting reproduction sequence information 61. The second cell start address information 61C indicates a recording start position on the second DVD of second cell information 61E that is information on a second cell contained in the third setting reproduction sequence information 61. The first cell information 61D indicates the contents of an audio object AOB that configures the first cell. The second cell information 61E indicates the contents of the audio object AOB that configures the second cell.

Furthermore, the first cell information 61D is composed of: an object number 61D1; a first cell reproduction start time information 61D2; and first cell reproduction end time information 61D3. The object number 61D1 indicates the number of the audio object AOB that configures the first cell. Therefore, the value of object number 61D1 indicates "3" of a third audio object AOB3. The first cell reproduction start time information 61D2 indicates a reproduction start time of audio information in an audio object AOB3 defined as the first cell. Therefore, the value of the first cell reproduction start time information 61D2 is defined as "0 hours, 0 minutes and 0 seconds", for example. The first cell reproduction end time information 61D3 indicates a reproduction end time of the audio information. Therefore, the value of first cell reproduction end time information 61D3 is defined as "0 hours, 14 minutes and 29 seconds", for example.

Second cell information 61E is composed of: an object number 61E1; second cell reproduction start time information 61E2; and second cell reproduction end time information 61E3. The object number 61E1 indicates the number of the audio object AOB that configures the second cell. Therefore, the value of the object number 61E1 indicates "5" of a fifth audio object AOB5. The second cell reproduction start time information 61E2 indicates a reproduction start time of audio information in the fifth audio object AOB5 defined as the second cell. Therefore, the value of the second cell reproduction start time information 61E2 is defined as "0 hours, 25 minutes and 0 seconds". The second cell reproduction end time information 61E3 indicates a reproduction end time of the audio information. Therefore, the value of the second cell reproduction end time information 61E3 is defined as "0 hours, 39 minutes and 29 seconds", for example.

Finally, an example of each of information to be contained in the integrated reproduction list GL according to the present invention, will be described with reference to FIG. 9.

FIG. 9 illustrates the integrated reproduction list pointer table GPT including: a first integrated reproduction list; a second integrated reproduction list; and a third integrated reproduction list as integrated reproduction lists, which are recorded in the DVD 1' (the DVD 1' is a third DVD other than the first DVD and the second DVD), for sequentially reproducing audio information and video information, which are recorded in the first DVD and the second DVD, across its boundary in the example shown in FIGS. 6A and 6B. The first integrated reproduction list is formed so as to reproduce in order of a second reproduction list on the audio information (second setting reproduction sequence information 60) shown in FIG. 8, a second reproduction list on the video information (second setting reproduction sequence information 54) shown in FIG. 7, and a first reproduction list on the audio information shown in FIG. 8 (first setting reproduction sequence information 59). The second integrated reproduction list is formed so as to reproduce in order of a first reproduction list on the video information (first setting reproduction sequence information 53) shown in FIG. 7 and a third reproduction list on the audio information (third setting reproduction sequence information 61) shown in FIG. 8. The third integrated reproduction list is formed so as to reproduce only the first reproduction list on the audio information (first setting reproduction sequence information 59) shown in FIG. 8.

As shown in FIG. 9, the integrated reproduction list pointer table GPT concerning the audio information and video information having the above-mentioned contents is composed of: integrated reproduction list pointer table general information 65; first integrated reproduction list start address information 66; second integrated reproduction list start address information 67; third integrated reproduction list start address information 68; a first integrated reproduction list 69; a second integrated reproduction list 70; a third integrated reproduction list 71; disk identification information table start address information 72; and a disk identification information table 73. The integrated reproduction list pointer table general information 65 describes information concerning the integrated reproduction list pointer table GPT as a whole. The first integrated reproduction list start address information 66 indicates a recording start position on the DVD 1' of the first integrated reproduction list 69. The second integrated reproduction list start address information 67 indicates a recording start position on the DVD 1' of the second integrated reproduction list 70. The third integrated reproduction list start address information 68 indicates a recording start position on the DVD 1' of the third integrated reproduction list 71. The disk identification information table start address information 72 indicates a recording start position on the DVD 1' of the disk identification information table DIT on the DVD 1'. The disk identification information table 73 corresponds to the disk identification information table DIT in FIG. 5.

Among them, the integrated reproduction list pointer table general information 65, the first integrated reproduction list start address information 66, the second integrated reproduction list start address information 67, and the third integrated reproduction list start address information 68, correspond to the integrated reproduction list general information GGI shown in FIG. 5.

The integrated reproduction list pointer table general information 65 is composed of; a pointer total number 65A; and an integrated reproduction list pointer table end address information 65B. The pointer total number 65A indicates a total number of pointers (start address information) contained in the integrated reproduction list pointer table GPT. Therefore, the value of the pointer total number 65A is "3" in this example. The integrated reproduction list pointer table end address information 65B indicates a recording end position on the DVD 1 of the integrated reproduction list pointer GPT.

Further, a first integrated reproduction list 69 is composed of: a reproduction list total number 69A; a first reproduction list 69B; a second reproduction list 60C; and a third reproduction list 69D. The reproduction list total number 69A indicates a total number of reproduction lists contained in the first integrated reproduction list 69. Therefore, the value of reproduction list total number 69A is "3". The first reproduction list 69B indicates the contents of the first reproduction list that configures the first integrated reproduction list 69. The second reproduction list 60C indicates the contents of the second reproduction list that configures the first integrated reproduction list 69. The third reproduction list 69D indicates the contents of the third reproduction list that configures the first integrated reproduction list 69.

Furthermore, the first reproduction list 69B is composed of: a disk identification information pointer 60B1; identification information 69B2; and a reproduction list number 69B3. The disk identification information pointer 69B1 describes a recording start position on the DVD 1' of disk identification information indicating the second DVD in which a reproduction list (the second setting reproduction sequence information 60) corresponding to the first reproduction list 69B is recorded. The identification information 69B2 describes an attribute of the second setting reproduction sequence information 60, which indicates whether or not the reproduction list corresponds to the audio information or to the video information. Therefore, the value of the identification information 69B2 indicates the audio information in this example. The reproduction list number 69B3 describes the number of the second setting reproduction sequence information 60. Therefore, the number of the reproduction list number 69B3 is "2" in this example.

The second reproduction list 69C is composed of: a disk identification information pointer 69C1; identification information 69C2; and a reproduction list number 69C3. The disk identification information pointer 69C1 describes a recording start position on the DVD 1' of disk identification information indicating the first DVD in which a reproduction list (the second setting reproduction sequence information 54) corresponding to the second reproduction list 69C is recorded. The identification information 69C2 describes an attribute of the second setting reproduction sequence information 54. Therefore, the value of the identification information 69C2 indicates the video information in this example. The reproduction list number 69C3 describes the number of the second setting reproduction sequence information 54. Therefore, the value of the reproduction list number 69C3 is "2" in this example.

Further, the third reproduction list 69D is composed of: a disk identification information pointer 69D1; identification information 69D2; and a reproduction list number 69D3. The disk identification information pointer 69D1 describes a recording start position on the DVD 1' of disk identification information indicating the second DVD in which a reproduction list (the first setting reproduction sequence information 59) corresponding to the third reproduction list 69D is recorded. The identification information 69D2 describes an attribute of the first setting reproduction sequence information 59. Therefore, the value of identification information 69D2 indicates the audio information in this example. The reproduction list number 69D3 describes the number of the first setting reproduction sequence information 59. Therefore, the value of the reproduction list number 69D3 is 1 in this example.

The second integrated reproduction list 70 is composed of: a reproduction list total number 70A; a first reproduction list 70B; and a second reproduction list 70C. The reproduction list total number 70A indicates a total number of reproduction lists contained in the second integrated reproduction list 70. Therefore, the value of reproduction list total number 70A is "2" in this example. The first reproduction list 70B indicates the contents of the first reproduction list that configures the second integrated reproduction list 70. The second reproduction list 70C indicates the contents of the second reproduction list that configures the second integrated reproduction list 70.

Furthermore, the first reproduction list 70B is composed of: a disk identification information pointer 70B1; identification information 70B2; and a reproduction list number 70B3. The disk identification information pointer 70B1 describes a recording start position on the DVD 1' of disk identification information indicating the first DVD in which a reproduction list (the first setting reproduction sequence information 53) corresponding to the first reproduction list 70B is recorded. The identification information 70B2 describing an attribute of the first setting reproduction sequence information 53. Therefore, the value of the identification information 70B2 indicates the video information. The reproduction list number 70B3 describes the number of the first setting reproduction sequence information 53. Therefore, the value of the reproduction list number 70B3 is "1" in this example.

The second reproduction list 70C is composed of: a disk identification information pointer 70C1; identification information 70C2; and a reproduction list number 70C3. The disk identification information pointer 70C1 describes a recording start position on the DVD 1' of disk identification information indicating the second DVD in which a reproduction list (the third setting reproduction sequence information 61) corresponding to the second reproduction list 70C is recorded. The identification information 70C2 describes an attribute of the third setting reproduction sequence information 61. Therefore, the value of the identification information 70C2 indicates the audio information in this example. The reproduction list number 70C3 describes the number of the third setting reproduction sequence information 61. Therefore, the value of reproduction list number 70C3 is "3" in this example.

Further, the third integrated reproduction list 71 is composed of: a reproduction list total number 71A; and a first reproduction list 71B. The reproduction list total number 71A indicates a total number of reproduction lists contained in the third integrated reproduction list 71. Therefore, the value of the reproduction list total number 71A is "1". The first reproduction list 71B indicates the contents of the first reproduction list that configures the third integrated reproduction list 71.

The first reproduction list 71B is composed of: a disk identification information pointer 70B1; identification information 71B2; and a reproduction list number 71B3. The disk identification information pointer 71B1 describes a recording start position on the DVD 1' of disk identification information indicating the second DVD in which a reproduction list (the first setting reproduction sequence information 59) corresponding to the first reproduction list 71B is recorded. The identification information 71B2 describes an attribute of the first setting reproduction sequence information 59. Therefore, the value of the identification information 71B2 indicates the audio information in this example. The reproduction list number 71B3 describes the number of the first setting reproduction sequence information 59. Therefore, the value of which is "1" in this example.

The disk identification information table 73 includes: a first disk identification information 73A indicating the first DVD; a second disk identification information 73B indicating the second DVD indicating the second DVD.

The integrated reproduction list GL shown in FIG. 9 might include a reproduction list PT recorded previously in a DVD itself in which the integrated reproduction list GL is recorded (the DVD is the DVD 1' in the preferred embodiment). In this case, the disk identification information pointer corresponding to the reproduction list PT in FIG. 9 describes zero data In other words, if the disk identification information pointer describes zero data, the reproduction list PT is recorded in other area on a DVD in which the integrated reproduction list GL is recorded. Further, in this case, the disk identification information corresponding to the disk identification information pointer describing zero data describes no information.

Thus, it is possible to prevent the integrated reproduction list GL itself from bloating (becoming redundant). Further, even in a reproduction control using the integrated reproduction list GL, it is possible to perform the reproduction control easily by promptly keeping track of the recording location of the reproduction list to be reproduced.

When a DVD in which the integrated reproduction list GL of the preferred embodiment is recorded is loaded in an information recording reproducing apparatus in which only one DVD can be loaded, which is the one except an information recording reproducing apparatus S described later, only each disk identification information pointer describing zero data is extracted and used for the reproduction control. Thus, it is possible to perform the reproduction control for both the video information and the audio information based on the integrated reproduction list GL even in the information recording reproducing apparatus in which only one DVD can be loaded.

The integrated reproduction list GL can be comprised by using not only a reproduction list on a DVD in which only vide information or only audio information is recorded but also a reproduction list recorded already on another DVD having a physical format shown in FIG. 5.

(III) Embodiments of Recording and Reproduction Processing

Next, processing for generating the described integrated reproduction list GL to record in the DVD 1' and reproducing from DVD 1' or the other DVD the video information and audio information by employing the recorded integrated reproduction list GL will be described with reference to FIG. 10 to FIG. 13.

Figure 10:
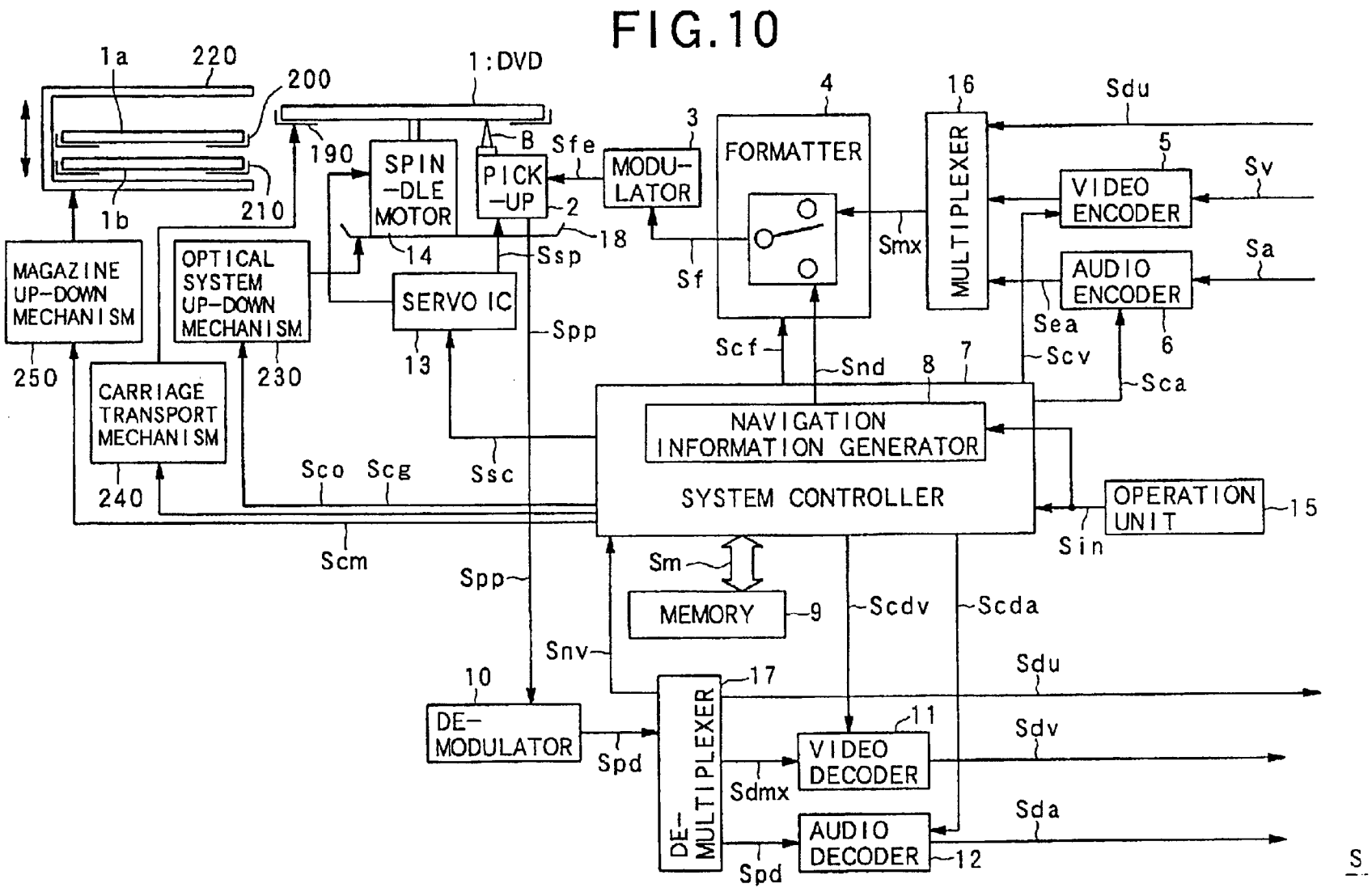
FIG. 10 is a block diagram showing an outline configuration of an information recording and reproducing apparatus according to an embodiment of the present invention.
Figure 11:
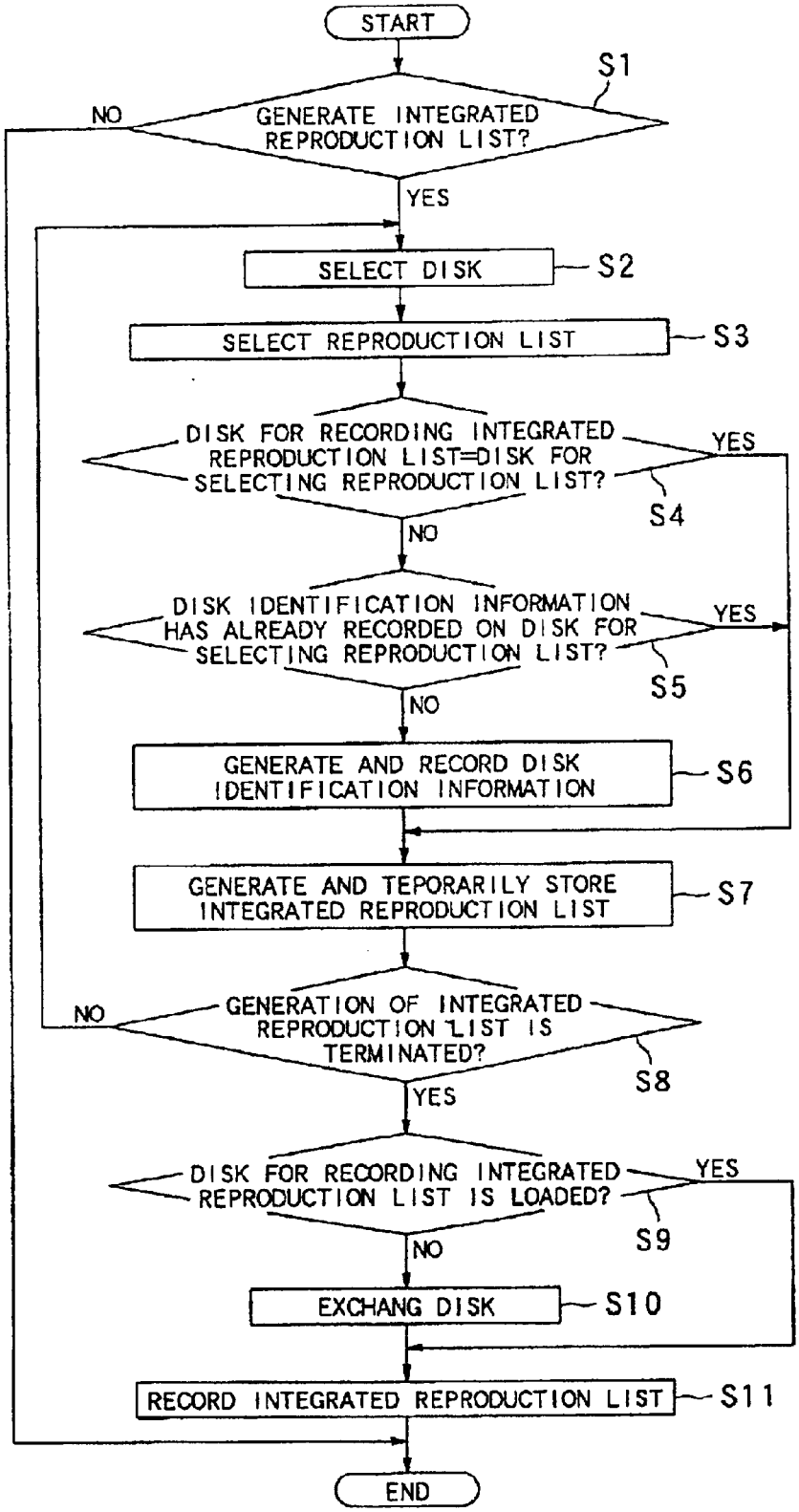
FIG. 11 is a flow chart showing recording processing of an integrated reproduction list.
Figure 12:
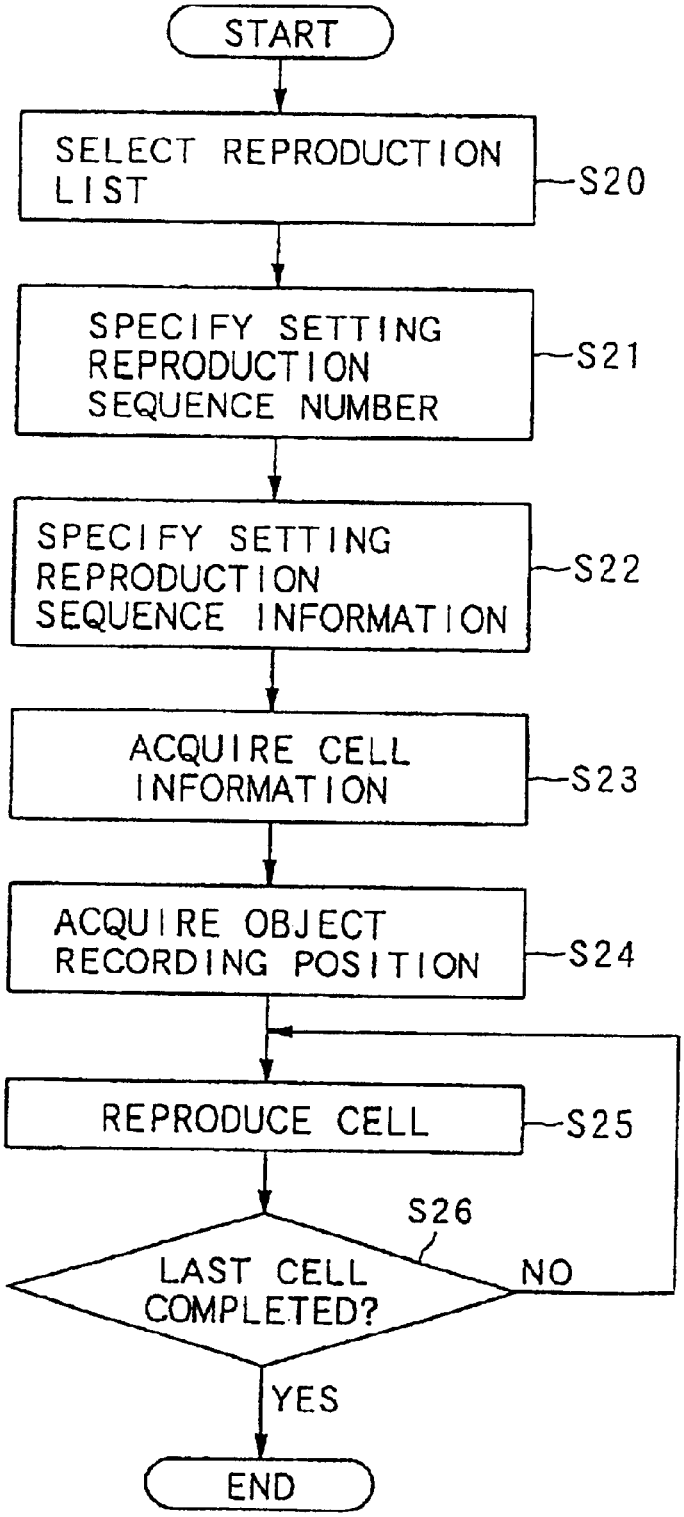
FIG. 12 is a flow chart showing a reproduction processing using a reproduction list.
Figure 13:
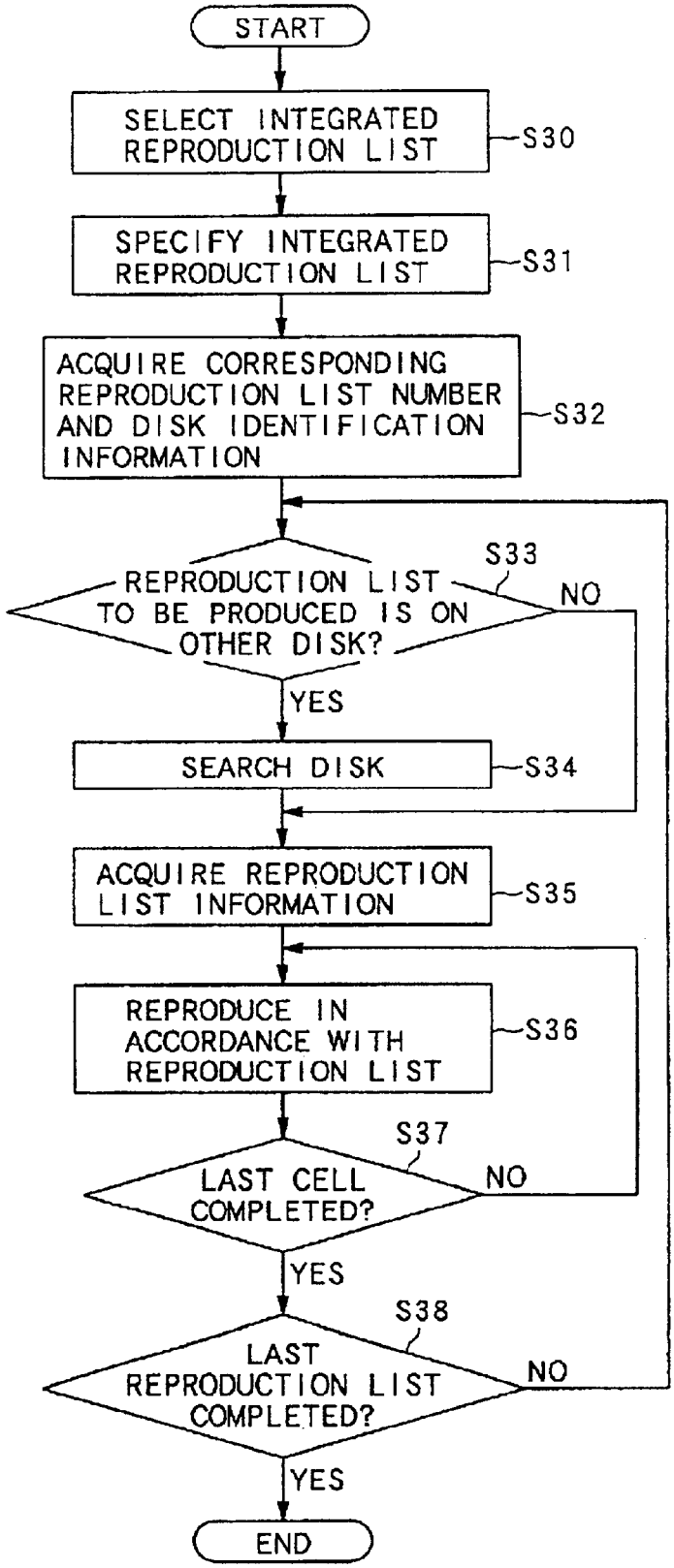
FIG. 13 is a flow chart showing reproduction processing using the integrated reproduction list.

FIG. 10 is a block diagram showing a general configuration of an information recording and reproducing apparatus according to the preferred embodiment employed for the recording processing and reproduction processing. FIG. 11 is a flow chart illustrating recording processing of the integrated reproduction list GL. FIG. 12 and FIG. 13 are flow charts each showing reproduction processing employing the integrated reproduction list GL.

First, a general configuration of an information recording and reproducing apparatus that executes the recording processing and reproduction processing, will be described with reference to FIG. 10. FIG. 10 is a block diagram showing a general configuration of the information recording and reproducing apparatus.

The following description concerns recording processing and reproduction processing in an information recording and reproducing apparatus capable of recording in the DVD 1', computer data information as well as the above video information and audio information, and capable of reproducing the information from the DVD 1'.

As shown in FIG. 10, an information recording reproduction apparatus S according to the embodiment is comprised of a pickup 2 as a recording device and a reproducing device, a modulator 3, a formatter 4, a video encoder 5, an audio encoder 6, a system controller 7 as an acquiring device, a memory 9, a demodulator 10, a video decoder 11, an audio decoder 12, a servo IC (Integrated Circuit) 13, a spindle motor 14 and an operation unit 15 as a selecting device, a multiplexer 16, a demultiplexer 17, an optical system supporting portion 18, carriages 190 to 210, a magazine 220, an optical system up-down mechanism 230, a carriage transport mechanism 240, and an magazine up-down mechanism 250.

Additionally, the system controller 7 is provided with a navigation information generator 8 as a generating device and a procedure information generating device.

Further, in the magazine 220 capable of storing a plurality of DVDs, the DVD 1', the first DVD 1a, and the second DVD 1b are stored so that these DVDs are located on the carriages 190 to 210 respectively.

Next, schematic operations of respective units will be explained below.

The spindle motor 14 rotates the DVD 1' (or the first DVD 1a, or the second DVD 1b) with predetermined number of revolutions on the basis of a spindle controlling signal Sss from the servo IC13.

In the case of exchanging a DVD loaded on the spindle motor 14 for the other DVD, the spindle motor 14 and the pickup 2 moves toward a lower position in FIG. 10 with the optical system supporting portion 18. Thus, the DVD is unloaded from the spindle motor 14, and the DVD is supported at the position as is by any one of carriages 190 to 210.

Next, the carriage supporting the unloaded DVD is transported to a preset storing position in the magazine 220 by the operation of the carriage transporting mechanism 240 based on a control signal Scg from the system controller 7. At this time, the magazine 220 performs up-and-down movements as necessary by the operation of the magazine up-down mechanism 250 based on a control signal Scm from the system controller 7 so that the carriage supporting the unloaded DVD is transported to the preset storing position.

After the unloaded DVD is stored with the carriage in the preset storing position in the magazine 220, another carriage supporting a DVD to be newly loaded in the spindle motor 14 is drawn from the magazine 220 by the carriage transporting mechanism 240 based on a control signal Scg from the system controller 7 to be transported to a loading position. At this time, the magazine 220 performs up-and-down movements as necessary by the operation of the magazine up-down mechanism 250 based on the control signal Scm from the system controller 7 so that the carriage supporting the DVD to be newly loaded is transported to the loading position.

After the DVD to be newly loaded is transported to a position of the spindle motor 14, the spindle motor and the pickup 2 located in downward position up to that time ascends to a position of the loading position of the DVD by the operation of the optical up-down mechanism 230 based on a control signal Sco from the system controller 7. Thus, the DVD is loaded in the spindle motor 14, so that it is possible to record information in the DVD or reproduce information from the DVD.

Video information Sv that is recording information to be recorded in the video object recording area VOR in the DVD 1' is inputted from the outside, then, it is inputted in the video encoder 5.

Further, the video encoder 5 performs a predetermined encoding processing, which is specifically, for example, compression encoding processing in an MPEG (Moving Picture Experts Group) system, with respect to the video information Sv on the basis of a controlling signal Scv from the system controller 7 and generates a encoding video signal Sev to output it to the multiplexer 16.

On the other hand, audio information Sa that is recording information to be recorded in the audio object recording area AOR in the DVD 1' is inputted from the outside, then, it is inputted in the audio encoder 6.

Then, the audio encoder 6 performs a predetermined encoding processing, which is specifically, for example, compression encoding processing in the MPEG system, with respect to the audio information Sa on the basis of a control signal Sca from the system controller 7 and generates an encoding audio signal Sea to output it to the multiplexer 16.

Further, data information Sdu that is recording information to be recorded in the DVD 1' is inputted from the outside, then it is directly outputted to the multiplexer 16.

In this manner, the multiplexer 16 superimposes (multiplexes) the image information on the voice information respectively contained in the encoding video signal Sev by means of predetermined processing, and generates a multiplex signal Smx to output it to the formatter 4.

At this time, the multiplexer 16 passes the encoding audio signal Sea and data information Sdu intact, and generates a multiplex signal Smx.

Next, the formatter 4 combines a navigation information signal Snd from the navigation information generator 8 to be described later and the multiplex signal Smx on the basis of a controlling signal Scf from the system controller 7 so that they are formed in a physical format in FIG. 5. Then, the formatter 4 generates a format signal Smt to output it to the modulator 3.

At this time, each of recording information inputted as the multiplex signal Smx to the formatter 4 is outputted as a recording information signal Sfm to the system controller 7 at a predetermined timing in order to generate the navigation information in the navigation information generator 8.

After that, the modulator 3 provides the formal signal Smt with predetermined modulation processing, which is specifically, for example, 8–16 modulation processing, and generates a modulation signal Sfe to outputted it to the pickup 2.

Thus, the pickup 2 generates an optical beam B, whose strength is modulated by the modulation signal Sfe, and irradiates it to an information track in an information recording surface (not illustrated) of the DVD 1', so that pits in associated with the navigation information, which is included in the modulation signal Sfe, and each of the recording information are generated on the information track. Thus, the pickup 2 records the navigation information and each of the recording information on the DVD 1' in a physical format shown in FIG. 5.

In the above case, an objective lens (not illustrated) in the pickup 2 (an objective lens for condensing the optical beam B) is moved in the above vertical and horizontal directions on the basis of a pickup servo signal Ssp to be outputted from the servo IC 13. Namely, focus servo controlling and tracking servo controlling are performed. As a result, the declination between a condensing position of the optical beam B and the above information track in a vertical and horizontal directions with respect to the above information recording surface is dissolved.

Therefore, the servo IC 13 generates the above spindle controlling signal Sss and a pickup servo signal Ssp on the basis of a controlling signal Ssc from the system controller 7 to output these signals to the spindle motor 14 and the pickup 2, respectively.

On one hand, in the case of reproducing the recording information or the like, which has been already recorded in the DVD 1, the pickup 2 generates the optical beam B to be reproduced having certain strength and irradiates it to the information track in which the above pits are formed. Then, the pickup 2 generates a detecting signal Spp in associated with the recording information or the like on the basis of its reflection light and outputs it to the decoder 10.

Thus, the decoder 10 provides the detecting signal Spp with demodulation processing in associated with the modulation processing in the above modulator 3, and generates a demodulation signal Spd to output it to the demultiplexer 17.

When the demodulation signal Spd includes the video information, the demultiplexer 17 separates the image information and voice information contained in the video information from each other, and generates a separate signal Sdmx to output it to the video decoder 11.

When the demodulation signal Spd includes the audio information, the demutiplexer 17 passes the demodulation signal Spd intact, and outputs it to the audio decoder 12.

Further, when demodulation signal Spd includes the data information, the demultiplexer 17 passes the demodulation signal Spd intact, and outputs data information Sdu to an external computer (not shown) or the like.

The demultiplexer 17 extracts each of the above navigation information from among the modulation signal Spd, and outputs a extracting navigation signal Snv to the system controller 7 during generation of the integrated reproduction list GL described later or the like.

Then, the video decoder 11 provides the separate signal Sdmx with decoding processing in associated with the encoding processing in the video encoder 5 on the basis of a controlling signal Scdv from the system controller 7, and generates a decoding video signal Sdv to output it to an external monitor (not shown) or the like.

Further, the audio decoder 12 provides the demodulation signal Spd including the audio information with decoding processing in associated with the encoding processing in the audio encoder 6 on the basis of a control signal Scda from the system controller 7, and outputs it to an external amplifier (not shown) or the like.

On the other hand, the operation unit 15 generates an operation signal Sin in associated with the operation and outputs it to the system controller 7 when the operation is performed by the user to perform the recording and reproducing processing in the information recording reproduction apparatus S.

Further, the navigation information generator 8 generates the above navigation information signal Snd including the above respective navigation information to be recorded on the DVD 1' during recording processing described later, and outputs it to one input terminal of the formatter 4, under the control of the system controller 7 based on the operation signal Sin and recording information signal Sfm.

As a result, the recording information in the multiplex signal Smx and the navigation information in the navigation information signal Snd are superimposed by the above formatter 4, so that the format signal Smt including the recording information, which has the physical format shown in FIG. 5, is generated.

In parallel with these operations, the system controller 7 gives and receives information necessary as a memory signal Sm to and from the memory 9, generates respective controlling signals Scv, Sca, Scf, Ssc, Scdv and Scda for controlling the above respective operations and outputs them to component materials in associated with respective controlling signals. In addition, the system controller 7 generates respective controlling signals Sco, Scg and Scm for controlling the exchanging operations and outputs them to component materials necessary for exchanging operations.

Next, recording processing for recording the integrated reproduction list GL according to the preferred embodiments in the DVD 1' in accordance with a physical format shown in FIG. 5, will be described with reference to FIG. 11.

The recording processing shown in FIG. 11 is mainly executed by the system controller 7 and navigation information generator 8.

In recording the integrated reproduction list GL, the video navigation information area VNA; audio navigation information area ANA; video object recording area VOR; audio object recording area AOR; video information and the like including corresponding navigation information on the first DVD 1a; and audio information and the like including corresponding navigation information on the second DVD 1b shown in FIG. 5, have been already formed on a DVD 1', the first DVD 1a and the second DVD 1b in the manner shown in FIG. 5 by using a known method for forming a physical format shown in FIG. 1.

In recording processing of the integrated reproduction list GL, as shown in FIG. 11, it is determined whether or not the integrated reproduction list GL is instructed to be formed at the operating portion 15 (step S1). When the result of the determination is negative (step S1: NO), processing is terminated. When the result of the determination is affirmative (step S1: YES), any one of DVDs (DVD 1', the first DVD 1a and the second DVD 1b), in which the reproduction list to be read as the integrated reproduction list GL is recorded, is selected and loaded in the spindle motor 14 (step S2). Further, the reproduction list to be read is selectively extracted from the loaded DVD (step S3).

Next, it is determined based on the disk identified information DID in each DVD whether or not the DVD loaded in the spindle motor 14 whose reproduction list is currently selected in the step S2 is the same as the DVD (DVD 1' in the preferred embodiment) in which the integrated reproduction list GL to be finally generated is recorded (step S4).

When the loaded DVD is the same as the DVD in which the integrated reproduction list GL is recorded (step S4; YES), processing goes to step S7 described later. On the other hand, when the loaded DVD is not the same as the DVD in which the integrated reproduction list GL is recorded (step S4; No), it is confirmed whether or not the disk identification information DID has already recorded on the DVD currently loaded in the spindle motor 14 (step S5, refer to FIG. 1).

When the disk identification information DID has already recorded on the DVD (step S5; YES), processing goes to the step S7 described later. On the other hand, when the disk identification information DID has not recorded on the DVD yet (step S5; NO), a disk identification information DID corresponding to the DVD currently loaded in the spindle motor 14 is newly generated to be recorded in the DVD (step S6). After that, an integrated reproduction list GL is generated by using information relative to the reproduction list selected in the step S3 to be temporarily stored in a memory (step S7).

In the step S7, more specifically, there are performed the following operations: an operation of confirming whether any one of video information and audio information is used as recording information read for the integrated reproduction information list GL; an operation of selecting and extracting corresponding reproduction lists from the setting reproduction sequence information UDI in each DVD; an operation of generating the integrated reproduction list GL reading the selected and extracted reproduction list, and the integrated reproduction list pointer table GPT including them; and the like.

Then, it is determined whether or not the operation of generating the integrated reproduction list GL is terminated (step S8). When the operation is not terminated (step S8; NO), processing returns to the step S2 and the above-mentioned processing is repeatedly performed. On the other hand, when the operation is terminated (step S8; YES), it is confirmed whether or not the DVD, in which the generated integrated reproduction list GL should be recorded, is currently loaded in the spindle motor 14 (step S9). When the DVD is loaded in it (step S9; YES), the integrated reproduction lists GL stored in the memory not shown in drawings and the integrated reproduction list pointer table GPT including them are recorded in an integrated navigation information are GNA in the DVD 1' (step S11). Then, processing is terminated.

On the other hand, the determination in the step S9, when the DVD 1' in which the integrated reproduction list GL should be recorded is not loaded in the spindle motor 14 (step S9; NO), the DVD currently loaded is exchanged for the DVD 1' (step S10). Then, after the processing of step S11 is performed, the recording processing is terminated.

Next, recording information reproduction processing employing the integrated reproduction list GL recorded by the above described recording processing, will be described with reference to FIG. 12 and FIG. 13.

First, recording information reproduction processing employing each reproduction list that is a premise of the reproduction processing, will be described with reference to FIG. 12.

In reproduction processing employing the reproduction list, as shown in FIG. 12, the reproduction list having the manner to be reproduced is first selected at the operating portion 15 (step S20). Next, the number of the setting reproduction sequence information UDI that corresponds to the selected reproduction list is specified by reading the reproduction list pointer (refer to reference code PLT shown in FIG. 1) (step S21). Further, each of reproduction sequence information start address information (refer to reference numerals 51 and 52 shown in FIG. 7 or reference numerals 56 to 58 shown in FIG. 8) is specified in accordance with the number of the specified setting reproduction sequence information UDI, thereby specifying a recording position of each of setting reproduction sequence information UDI (step S22).

Each of the defined cell information contained in the specified setting reproduction sequence information UDI (refer to reference numerals 53E to 53G and 54C shown in FIG. 7 or reference numerals 59D, 59E, 60C, 61D and 61E) is acquired at the recording position of the specified setting reproduction sequence information UDI (step S23). Then, the corresponding object file information table OFT (refer to FIG. 1) is referred to by employing the object number contained in each of the defined cell information, and the recording position of the object OBJ to be reproduced is acquired (step S24). Further, in parallel to this, an actual recording position of recording information is specified based on the reproduction start time information and end time information (refer to FIG. 3) of each defined cell UD contained in the object recording sequence information OSI.

In this manner, the specified object OBJ is reproduced in order of the defined cells UD specified in each of setting reproduction sequence information UDI (step S25).

Next, it is checked whether or not reproduction of the last defined cell UD described in the setting reproduction sequence information UDI that corresponds to the currently reproduced object OBJ has terminated (step S26). When the result of the check is affirmative (step S26: YES), reproduction of the reproduction list is terminated intact. When the result of the check is negative (step S26: NO), processing returns to the step S25 at which reproduction processing is continued.

Next, reproduction processing based on the integrated reproduction list GL according to the present invention, which uses reproduction processing based on the reproduction list shown in FIG. 12, will be described with reference to FIG. 13.

In reproduction processing employing the integrated reproduction list GL, as shown in FIG. 13, the integrated reproduction list GL having the manner to be reproduced is first selected at the operating portion 15 (step S30). Next, the recording position of the selected integrated reproduction list GL is specified by referring to the integrated reproduction list start address information (refer to reference numerals 66 to 68 shown in FIG. 9) (step S31). Then, the number and type of the reproduction list stored in the corresponding integrated reproduction list GL, and the disk identification information DID indicating a DVD in which the reproduction list is recorded are acquired (step S32).

Then, it is determined based on the disk identification information DID whether or not the DVD currently loaded in the spindle motor 14 is the same as the DVD in which the setting reproduction sequence information UDI including the reproduction list acquired in step S32 (step S33). When the DVD currently loaded in the spindle motor 14 is the same as the DVD in which the setting reproduction sequence information UDI (step S33; NO), processing goes to step S35. On the other hand, when the DVD currently loaded in the spindle motor 14 is not the same as the DVD in which the setting reproduction sequence information UDI (step S33; YES), the DVD, in which the setting reproduction sequence information UDI including the reproduction list to be reproduced is recorded, is loaded in the spindle motor 14 (step S34).

Each of information (refer to reference numeral 53 shown in FIG. 7, for example) concerning the reproduction list is acquired from the setting reproduction sequence information UDI on the loaded DVD (step S35). At the step S35, processing of the reproduction list shown in FIG. 12 is actually executed.

Next, as in the processing shown in FIG. 12, each defined cell UD is reproduced (step S36). Further, it is checked whether or not the reproduction of the last defined cell UD in the currently reproduced setting reproduction sequence information UDI is terminated (step S37).

When the reproduction is not terminated (step S37: NO), processing returns to the step S34 at which reproduction is continued. When reproduction of the last defined cell UD is terminated (step S37: YES), it is checked whether or not reproduction is terminated in accordance with the last reproduction list in the currently reproduced integrated reproduction list GL (for example, third reproduction list 69D exemplified in FIG. 9) (step S38).

In this way, when reproduction is terminated in accordance with the last reproduction list (step S38: YES), reproduction processing is terminated intact. When the reproduction is not terminated (step S38: NO), processing returns to the step S33 at which next reproduction list information is acquired, and the above reproduction processing is continued.

As has been described above, according to the recording and reproducing processing for the integrated reproduction list GL of the preferred embodiment, the integrated reproduction list GL for sequentially reproducing two or more kinds of recording information recorded astride two or more DVDs is recorded in the DVD 1', so that different kinds of recording information recorded astride two or more DVDs can be sequentially reproduced across the boundary in accordance with desired reproducing procedures.

In addition, the integrated reproduction list GL indicates the corresponding reproduction list by means of a pointer so that a desired reproduction list can be reliably specified and reproduced.

Further, each reproduction list is intended for reproducing each of the recording information in accordance with procedures that differs from the recording procedures when each of recording information is recorded, so that each of the recording information can be sequentially reproduced in the user desired manner.

Furthermore, each of the recording information is either the video information or the audio information, so that the video information and audio information can be reproduced all together.

Although the above described embodiments do not describe recording mode and reproduction mode of the data information, the reproduction mode of the data information can also be controlled in accordance with the integrated reproduction list GL like the other recording information.

(IV) Modified Embodiment of Recording Processing

Next, a modified embodiment of recording processing of the integrated reproduction list GL on the DVD 1' will be described with reference to FIG. 14.

Figure 14:
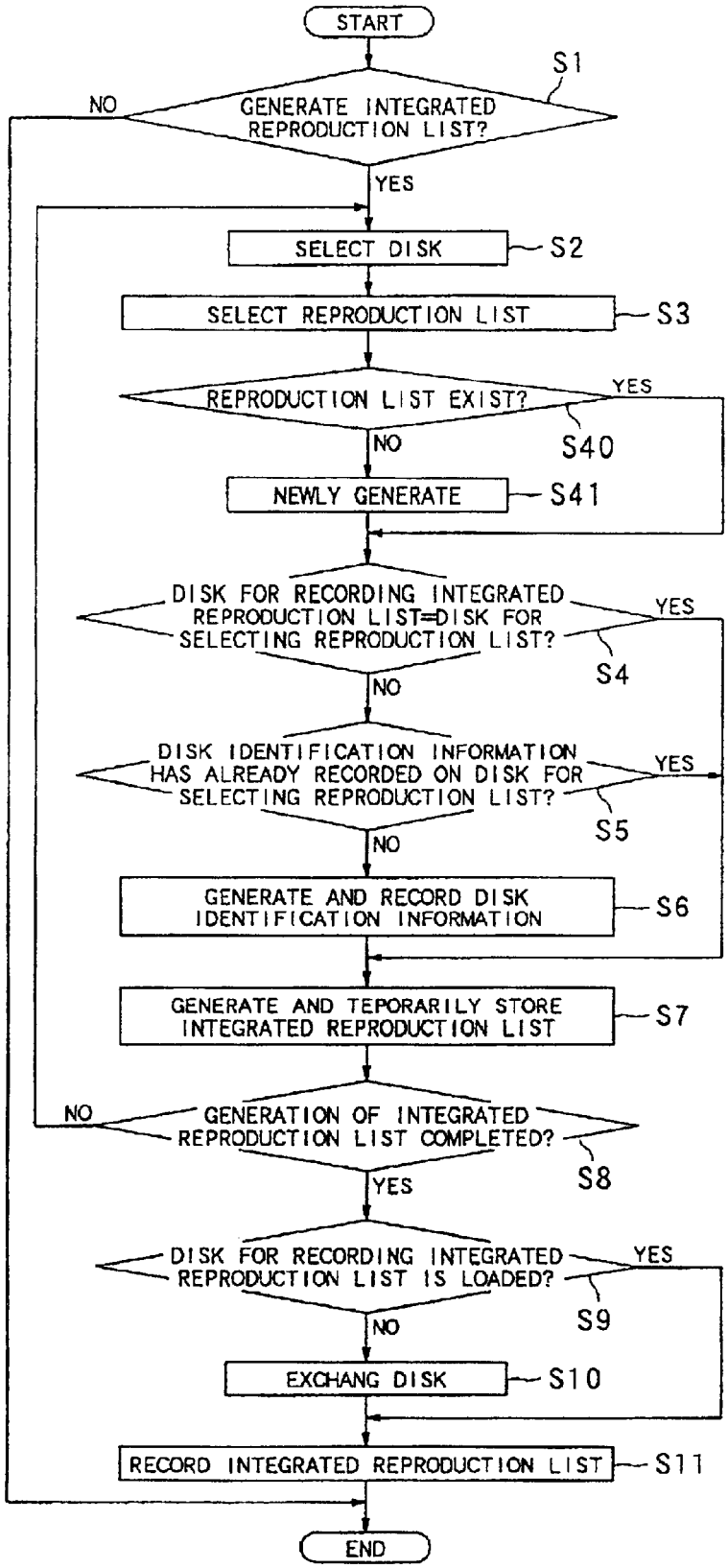
FIG. 14 is a flow chart showing recording processing of an integrated reproduction list according to a modified embodiment of the present invention.

FIG. 14 is a flow chart showing recording processing for recording the integrated reproduction list GL according to the modified embodiment in the DVD 1' in accordance with the physical format shown in FIG. 5, wherein the recording processing is mainly executed by the system controller 7 and navigation information generator 8.

In addition, a configuration of an information recording apparatus in which recording processing of the modified embodiment is executed is similar to that of the information recording and reproducing apparatus S of the embodiment. A detailed description is omitted here.

Further, in the processing shown in FIG. 14, the same step numbers are provided in the processing similar to the recording processing shown in FIG. 11 and detailed explanation will be omitted.

In the above described embodiments, there has been described a case in which the integrated reproduction list GL is formed by employing the reproduction list of each of the recording information that has been already recorded on each DVD. However, the present invention is applicable to a case of newly reproducing and acquiring a reproduction list that is not recorded on each DVD.

In recording processing of the integrated reproduction list GL of the modified embodiment, as shown in FIG. 14, steps S1 to S3 in the recording processing shown in FIG. 11 are performed, and then the processing of selecting a reproduction list to be contained as the integrated reproduction list GL is started.

Next, in the processing of selecting the reproduction list, it is checked whether or not the reproduction list to be selected exists (step S40). When the result of the check is affirmative (step S40: YES), processing goes to the step S4 in the recording processing shown in FIG. 4. When the reproduction list to be selected does not exist in any DVDs (step S40: NO), the reproduction list is newly generated, and is temporarily stored in the above memory (not shown) incorporated in the system controller 7 (step S41). After that, the steps S4 to S11 in the recording processing shown in FIG. 11 are performed, and the recording processing is terminated.

According to the modified recording processing described above, when a desired reproduction list as an integrated reproduction list GL does not exist on any one of DVDs, a required reproduction list is newly generated, and the integrated reproduction list GL is generated. Thus, the integrated reproduction list GL can be further generated and recorded so as to be reproduced in accordance with the more freely determined reproducing procedures.

In the above described preferred embodiment and modified embodiment, there has been described processing executed under the control of the system controller 7 provided in the information recording and reproducing apparatus S. Otherwise, a program corresponding to the flow chart shown in FIG. 11 to FIG. 14 is stored in a flexible disk or hard disk and the like that is an information recording medium, and the program is read out and executed by a personal computer or the like, whereby the personal computer can be operated as the above system controller 7.

As designated by reference numeral 71 in FIG. 9 in the above embodiment, of course, one integrated reproduction list GL (third integrated reproduction list 71 shown in FIG. 9) can be composed of only one reproduction list (first reproduction list 71B in shown in FIG. 9).

Further, in the preferred embodiment and the modified embodiment, there has been described the case where the integrated reproduction list GL is generated by using different kinds of recording information. Otherwise, when there are a plurality of DVDs in which only video information is recorded, it is possible to generate one integrated reproduction list by gathering reproduction lists which are recorded astride the plurality of DVDs. Further, when there are a plurality of DVDs in which only audio information is recorded, it is possible to generate one integrated reproduction list by gathering reproduction lists which are recorded astride the plurality of DVDs.

In these cases, each integrated reproduction list is generated by employing each disk identification information DID recorded in each DVD.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000-209026 filed on Jul. 10, 2000 including the specification, claims, drawings and summary is incorporated herein by reference in its entirety.

What is claimed is:

1. An information recording medium including recording information area in which recording information is recorded and reproducing procedure information [recoding] *recording* area in which reproducing procedure information indicating at least one reproducing procedure to reproduce the recording information is recorded, wherein the information recording medium further includes integrated reproducing procedure information [recoding] *recording* area in which integrated reproducing procedure information is recorded, the integrated reproducing procedure information indicating at least one reproducing procedure to sequentially reproduce a plurality of the recording information including recording information recorded in other information recording medium.

2. The information recording medium according to claim 1, wherein the integrated reproducing procedure information includes at least: indicative information indicating the reproducing procedure information that corresponds to the recording information to be sequentially reproduced; and recording medium identification information indicating the other information recording medium.

3. The information recording medium according to claim 2, wherein the integrated reproducing procedure information further includes the indicative information indicating the reproducing procedure information contained in the recording medium itself in which the integrated reproducing procedure information is recorded, and the recording medium identification information indicates only said other information recording medium.

4. The information recording medium according to claim 1, wherein each of the reproducing procedure information includes at least one reproducing procedure to reproduce each of the recording information in accordance with a procedure that differs from a recording procedure when each of the recording information is recorded in the information recording medium.

5. The information recording medium according to claim 1, wherein each of the recording information is any one of video information, audio information and data information.

6. The information recording medium according to claim 1, wherein the information recording medium is a DVD.

7. An information recording apparatus for recording integrated reproducing procedure information in an information recording medium in which recording information is recorded together with reproducing procedure information indicating at least one reproducing procedure to reproduce the recording information, said integrated reproducing procedure information indicating at least one reproducing procedure to sequentially reproduce a plurality of recording information including recording information recorded in other information recording medium, said information recording apparatus comprising:

a selecting device for selecting the reproducing procedure information to be employed for generating the integrated reproducing procedure information;

a generating device for generating the integrated reproducing procedure information by employing the selected reproducing procedure information; and a recording device for recording the generated integrated reproducing procedure information in said information recording medium.

8. The information recording apparatus according to claim 7, further comprising:

a procedure information generating device for newly generating required reproducing procedure information when the reproducing procedure information to be employed for generating the integrated reproducing procedure information does not exist in any one of said information recording medium and said other information recording medium, wherein the generating device generates the integrated reproducing procedure information by employing the selected reproducing procedure information and the newly generated reproducing procedure information.

9. The information recording apparatus according to claim 7, wherein the integrated reproducing procedure information includes at least: indicative information indicating the reproducing procedure information that corresponds to the recording information to be sequentially reproduced; and recording medium identification information indicating the other information recording medium.

10. The information recording apparatus according to claim 8, wherein the integrated reproducing procedure information includes at least: indicative information indicating the reproducing procedure information that corresponds to the recording information to be sequentially reproduced; and recording medium identification information indicating the other information recording medium.

11. The information recording apparatus according to claim 9, wherein the integrated reproducing procedure information further includes the indicative information indicating the reproducing procedure information contained in the recording medium itself in which the integrated reproducing procedure information is recorded, and the recording medium identification information indicates only said other information recording medium.

12. The information recording apparatus according to claim 10, wherein the integrated reproducing procedure information further includes the indicative information indicating the reproducing procedure information contained in the recording medium itself in which the integrated reproducing procedure information is recorded, and the recording medium identification information indicates only said other information recording medium.

13. The information recording apparatus according to claim 7, wherein each of the recording information is any one of video information, audio information and data information.

14. The information recording apparatus according to claim 7, wherein the information recording medium is a DVD.

15. An information recording method for recording integrated reproducing procedure information in an information recording medium in which recording information is recorded together with reproducing procedure information indicating at least one reproducing procedure to reproduce the recording information, said integrated reproducing procedure information indicating at least one reproducing procedure to sequentially reproduce a plurality of recording information including recording information recorded in other information recording medium, said information recording method comprising the processes of:

selecting the reproducing procedure information to be employed for generating the integrated reproducing procedure information from a plurality of information recording mediums;

generating the integrated reproducing procedure information by employing the selected reproducing procedure information; and recording the generated integrated reproducing procedure information in said information recording medium.

16. The information recording method according to claim 15, further comprising the process of:

newly generating required reproducing procedure information when the reproducing procedure information to be employed for generating the integrated reproducing procedure information does not exist in any one of said information recording medium and said other information recording medium, wherein the process of generating the integrated reproducing procedure information generates the integrated generating procedure information by employing the selected generating procedure information and the newly generated reproducing procedure information.

17. The information recording method according to claim 15, wherein the integrated reproducing procedure information includes at least: indicative information indicating the reproducing procedure information that corresponds to the recording information to be sequentially reproduced; and recording medium identification information indicating the other information recording medium.

18. The information recording method according to claim 16, wherein the integrated reproducing procedure information includes at least: indicative information indicating the reproducing procedure information that corresponds to the recording information to be sequentially reproduced; and recording medium identification information indicating the other information recording medium.

19. The information recording method according to claim 17, wherein the integrated reproducing procedure information further includes the indicative information indicating the reproducing procedure information contained in the recording medium itself in which the integrated reproducing procedure information is recorded, and the recording medium identification information indicates only said other information recording medium.

20. The information recording method according to claim 18, wherein the integrated reproducing procedure information further includes the indicative information indicating the reproducing procedure information contained in the recording medium itself in which the integrated reproducing procedure information is recorded, and the recording medium identification information indicates only said other information recording medium.

21. An information recording medium in which an information recording control program is readably recorded by a computer included in an information recording apparatus for recording integrated reproducing procedure information in an information recording medium in which recording information is recorded together with reproducing procedure information indicating at least one reproducing procedure to reproduce the recording information, said integrated reproducing procedure information indicating at least one reproducing procedure to sequentially reproduce a plurality of recording information including recording information recorded in other information recording medium, said information recording control program causing the computer to function as:

a selecting device for selecting the reproducing procedure information to be employed for generating the integrated reproducing procedure information;

a generating device for generating the integrated reproducing procedure information by employing the selected reproducing procedure information; and a recording device for recording the generated integrated reproducing procedure information in said information recording medium.

22. The information recording medium according to claim 21, wherein the information recording control program is readably recorded by the computer, the information recording control program causing the computer to further function as:

a procedure information generating device for newly generating required reproducing procedure information when the reproducing procedure information to be employed for generating the integrated reproducing procedure information does not exist in any one of said information recording medium and said other information recording medium, wherein the generating device generates the integrated reproducing procedure information by employing the selected reproducing procedure information and the newly generated reproducing procedure information.

23. An information reproducing apparatus for reproducing recording information from an information recording medium in which integrated reproducing procedure information is recorded in an information recording medium in which recording information is recorded together with reproducing procedure information indicating at least one reproducing procedure to reproduce the recording information, said integrated reproducing procedure information indicating at least one reproducing procedure to sequentially reproduce a plurality of recording information including recording information recorded in other information recording medium, said information reproducing apparatus comprising:

a selecting device for selecting any one of the integrated reproducing procedure information from a plurality of information recording mediums;

an acquiring device for acquiring the reproducing procedure information from any one of said plurality of information recording mediums, said reproducing procedure information corresponding to at least one reproducing procedure indicated by the selected integrated reproducing procedure information; and a reproducing device for reproducing the [recoding] *recording* information in accordance with at least one reproducing procedure indicated by the acquired reproducing procedure information.

24. The information reproducing apparatus according to claim 23, wherein the integrated reproducing procedure information includes at least: indicative information indicating the reproducing procedure information that corresponds to the recording information to be sequentially reproduced; and recording medium identification information indicating the other information recording medium.

25. The information reproducing apparatus according to claim 24, wherein the integrated reproducing procedure information further includes the indicative information indicating the reproducing procedure information contained in the recording medium itself in which the integrated reproducing procedure information is recorded, and the recording medium identification information indicates only said other information recording medium.

26. The information reproducing apparatus according to claim 23, wherein each of the reproducing procedure information includes at least one reproducing procedure to reproduce each of the recording information in accordance with a procedure that differs from a recording procedure when each of the recording information is recorded in the information recording medium.

27. The information reproducing apparatus according to claim 23, wherein each of the recording information is any one of video information, audio information and data information.

28. The information reproducing apparatus according to claim 23, wherein the information recording medium is a DVD.

29. An information reproducing method for reproducing recording information from an information recording medium in which integrated reproducing procedure information is recorded in an information recording medium in which recording information is recorded together with reproducing procedure information indicating at least one reproducing procedure to reproduce the recording information, said integrated reproducing procedure information indicating at least one reproducing procedure to sequentially reproduce a plurality of recording information including recording information recorded in other information recording medium, said information reproducing method comprising the processes of:

selecting any one of the integrated reproducing procedure information from a plurality of information recording mediums;

acquiring the reproducing procedure information from any one of said plurality of information recording mediums, said reproducing procedure information corresponding to at least one reproducing procedure indicated by the selected integrated reproducing procedure information; and reproducing the [recoding] *recording* information in accordance with at least one reproducing procedure indicated by the acquired reproducing procedure information.

30. An information recording medium in which an information reproducing control program is readably recorded by a computer included in an information reproducing apparatus for reproducing recording information from an information recording medium in which integrated reproducing procedure information is recorded in an information recording medium in which recording information is recorded together with reproducing procedure information indicating at least one reproducing procedure to reproduce the recording information, said integrated reproducing procedure information indicating at least one reproducing procedure to sequentially reproduce a plurality of recording information including recording information recorded in other information recording medium, said information reproducing control program causing the computer to function as:

a selecting device for selecting any one of the integrated reproducing procedure information from a plurality of information recording mediums;

an acquiring device for acquiring the reproducing procedure information from any one of said plurality of information recording mediums, said reproducing procedure information corresponding to at least one reproducing procedure indicated by the selected integrated reproducing procedure information; and a reproducing device for reproducing the [recoding] *recording* information in accordance with at least one reproducing procedure indicated by the acquired reproducing procedure information.

[31. A computer data signal embodied in a carrier wave and representing a series of instructions which cause a computer to perform steps to execute a recording process in an information recording apparatus for recording integrated reproducing procedure information in an information recording medium in which recording information is recorded together with reproducing procedure information indicating at least one reproducing procedure to reproduce the recording information, said integrated reproducing procedure information indicating at least one reproducing procedure to sequentially reproduce a plurality of recording information including recording information recorded in other information recording medium, said steps comprising:

a selecting step for selecting the reproducing procedure information to be employed for generating the integrated reproducing procedure information;

a generating step for generating the integrated reproducing procedure information by employing the selected reproducing procedure information; and a recording step for recording the generated integrated reproducing procedure information in said information recording medium.]

[32. A computer data signal embodied in a carrier wave and representing a series of instructions which cause a computer to perform steps to execute a recording process in an information reproducing apparatus for reproducing recording information from an information recording medium in which integrated reproducing procedure information is recorded in an information recording medium in which recording information is recorded together with reproducing procedure information indicating at least one reproducing procedure to reproduce the recording information, said integrated reproducing procedure information indicating at least one reproducing procedure to sequentially reproduce a plurality of recording information including recording information recorded in other information recording medium, said steps comprising:

a selecting step for selecting any one of the integrated reproducing procedure information from a plurality of information recording mediums;

an acquiring step for acquiring the reproducing procedure information from any one of said plurality of information recording mediums, said reproducing procedure information corresponding to at least one reproducing procedure indicated by the selected integrated reproducing procedure information; and a reproducing step for reproducing the recoding information in accordance with the reproducing procedures indicated by the acquired reproducing procedure information.]

*33. An information recording medium comprising:*

*a recording information recording area in which at least a first recording information item is recorded;*

*a reproducing procedure information recording area in which reproducing procedure information indicating reproducing procedure of the first recording information item;*

*an integrated reproducing procedure information recording area in which integrated reproducing procedure information and start address information is recorded, the integrated reproducing procedure information indicating reproducing procedure to sequentially reproduce the first recording information item and at least a second recording information item recorded in other information recording medium, the start address information indicating a start address of the integrated reproducing procedure information; and*

*a relation information recording area in which relation information is recorded, the relation information indicating that the first recording information item is related to the other information recording medium.*

*34. The information recording medium according to claim 33, wherein the integrated reproducing procedure information comprises reference information to refer to the reproducing procedure information and other reproducing procedure information which indicates reproducing procedure of the second recording information item recorded in the other information recording medium and is recorded in the other information recording medium.*

*35. The information recording medium according to claim 33, wherein each of the reproducing procedure information includes at least one reproducing procedure to reproduce each of the recording information items in accordance with a procedure that differs from a recording procedure when each of the recording information items is recorded in the information recording medium.*

*36. An information recording apparatus for recording integrated reproducing procedure information, start address information and relation information in an information recording medium in which at least a first recording information item is recorded together with reproducing procedure information indicating reproducing procedure of the first recording information item, the integrated reproducing procedure information indicating reproducing procedure to*

*sequentially reproduce the first recording information item and at least a second recording information item recorded in other information recording medium, the start address information indicating a start address of the integrated reproducing procedure information, the relation information indicating that the first recording information item is related to the other information recording medium, the information recording apparatus comprising:*

*a selecting device for selecting the reproducing procedure information to be employed for generating the integrated reproducing procedure information;*

*a generating device for generating the integrated reproducing procedure information by employing the selected reproducing procedure information; and*

*a recording device for recording the generated integrated reproducing procedure information, the start address information and relation information in the information recording medium.*

*37. The information recording apparatus according to claim 36, wherein the integrated reproducing procedure information comprises reference information to refer to the reproducing procedure information and other reproducing procedure information which indicates reproducing procedure of the second recording information item recorded in the other information recording medium and is recorded in the other information recording medium.*

*38. An information recording method of recording integrated reproducing procedure information, start address information and relation information in an information recording medium in which at least a first recording information item is recorded together with reproducing procedure information indicating reproducing procedure of the first recording information item, the integrated reproducing procedure information indicating reproducing procedure to sequentially reproduce the first recording information item and at least a second recording information item recorded in other information recording medium, the start address information indicating a start address of the integrated reproducing procedure information, the relation information indicating that the first recording information item is related to the other information recording medium, the information recording method comprising the processes of:*

*selecting the reproducing procedure information to be employed for generating the integrated reproducing procedure information;*

*generating the integrated reproducing procedure information by employing the selected reproducing procedure information; and*

*recording the generated integrated reproducing procedure information, the start address information and relation information in the information recording medium.*

*39. The information recording method according to claim 38, wherein the integrated reproducing procedure information comprises reference information to refer to the reproducing procedure information and other reproducing procedure information which indicates reproducing procedure of the second recording information item recorded in the other information recording medium and is recorded in the other information recording medium.*

*40. An information reproducing apparatus for reproducing recording information from an information recording medium in which integrated reproducing procedure information, start address information, relation information, at least a first recording information item, and reproducing procedure information indicating reproducing procedure of the first recording information is recorded, the integrated reproducing procedure information indicating reproducing procedure to sequentially reproduce the first recording information item and at least a second recording information item recorded in other information recording medium, the start address information indicating a start address of the integrated reproducing procedure information, the relation information indicating that the first recording information item is related to the other information recording medium, the information reproducing apparatus comprising:*

*an extracting device for extracting the integrated reproducing procedure information and the relation information from data read out from information recording media;*

*an acquiring device for acquiring the reproducing procedure information from any one of the plurality of information recording media, the reproducing procedure information corresponding to at least one reproducing procedure indicated by the extracted integrated reproducing procedure information; and*

*a reproducing device for reproducing the recording information in accordance with at least one reproducing procedure indicated by the acquired reproducing procedure information.*

*41. The information reproducing apparatus according to claim 40, wherein the integrated reproducing procedure information comprises reference information to refer to the reproducing procedure information and other reproducing procedure information which indicates reproducing procedure of the second recording information item recorded in the other information recording medium and is recorded in the other information recording medium.*

*42. The information reproducing apparatus according to claim 40, wherein each of the reproducing procedure information includes at least one reproducing procedure to reproduce each of the recording information in accordance with a procedure that differs from a recording procedure when each of the recording information is recorded in the information recording medium.*

*43. An information reproducing method of reproducing recording information from an information recording medium in which integrated reproducing procedure information, start address information, relation information, at least a first recording information item, and reproducing procedure information indicating reproducing procedure of the first recording information is recorded, the integrated reproducing procedure information indicating reproducing procedure to sequentially reproduce the first recording information item and at least a second recording information item recorded in other information recording medium, the start address information indicating a start address of the integrated reproducing procedure information, the relation information indicating that the first recording information item is related to the other information recording medium, the information reproducing method comprising the processes of:*

*extracting the integrated reproducing procedure information and the relation information from data read out from information recording media;*

*acquiring the reproducing procedure information from any one of the plurality of information recording media, the reproducing procedure information corresponding to at least one reproducing procedure indicated by the extracted integrated reproducing procedure information; and*

*reproducing the recording information in accordance with at least one reproducing procedure indicated by the acquired reproducing procedure information.*

*44. The information reproducing method according to claim 43, wherein the integrated reproducing procedure information comprises reference information to refer to the reproducing procedure information and other reproducing procedure information which indicates reproducing procedure of the second recording information item recorded in the other information recording medium and is recorded in the other information recording medium.*

*45. The information reproducing method according to claim 43, wherein each of the reproducing procedure information includes at least one reproducing procedure to reproduce each of the recording information in accordance with a procedure that differs from a recording procedure when each of the recording information is recorded in the information recording medium.*

* * * * *